United States Patent
Kindo

(10) Patent No.: US 12,432,797 B2
(45) Date of Patent: Sep. 30, 2025

(54) WIRELESS COMMUNICATION DEVICE AND WIRELESS COMMUNICATION METHOD

(71) Applicant: Panasonic Intellectual Property Management Co., Ltd., Osaka (JP)

(72) Inventor: Tsuyoshi Kindo, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 363 days.

(21) Appl. No.: 18/304,057

(22) Filed: Apr. 20, 2023

(65) Prior Publication Data

US 2023/0345560 A1    Oct. 26, 2023

(30) Foreign Application Priority Data

Apr. 22, 2022    (JP) ................................ 2022-071181

(51) Int. Cl.
  *H04W 4/80*   (2018.01)
  *H04W 8/00*   (2009.01)
  *H04W 76/14*  (2018.01)

(52) U.S. Cl.
  CPC ............. *H04W 76/14* (2018.02); *H04W 4/80* (2018.02); *H04W 8/005* (2013.01)

(58) Field of Classification Search
  CPC ....... H04W 76/14; H04W 4/80; H04W 8/005; H04W 8/00
  See application file for complete search history.

(56) References Cited

U.S. PATENT DOCUMENTS

| | | | |
|---|---|---|---|
| 10,667,316 B1* | 5/2020 | Inoue ..................... | H04W 76/15 |
| 10,959,146 B2* | 3/2021 | Fujita .................... | H04W 48/16 |
| 2014/0129350 A1* | 5/2014 | Tashiro .............. | G06Q 30/0277 705/14.71 |
| 2015/0304803 A1* | 10/2015 | Chen ................. | H04W 52/0209 455/41.2 |

(Continued)

FOREIGN PATENT DOCUMENTS

JP    2019-83485 A    5/2019

*Primary Examiner* — Cindy Trandai
(74) *Attorney, Agent, or Firm* — Seed Intellectual Property Law Group LLP

(57) ABSTRACT

A wireless communication device includes a communication unit and a control circuit for controlling the communication unit. The control circuit sets, in the communication unit, a different advertising identifier for each application. The communication unit repeatedly transmits an advertising packet that corresponds to the set advertising identifier and does not include the advertising identifier, receives a connection request for wireless communication transmitted from a first wireless communication device that is one of the other wireless communication devices that have received the advertising packet, terminates transmission of the advertising packet transmitted immediately before the connection request is received, and wirelessly connects to the first wireless communication device. The control circuit determines whether the wirelessly connected first wireless communication device is a connection destination expected by a first advertising identifier being the advertising identifier corresponding to the advertising packet whose transmission is terminated.

10 Claims, 28 Drawing Sheets

(56) References Cited

U.S. PATENT DOCUMENTS

| | | | |
|---|---|---|---|
| 2016/0180397 A1* | 6/2016 | Taki | G06Q 30/0255 |
| | | | 705/14.53 |
| 2016/0278137 A1* | 9/2016 | Oguchi | H04W 4/80 |
| 2016/0337787 A1* | 11/2016 | Palin | H04W 4/50 |
| 2017/0310849 A1* | 10/2017 | Hosoda | H04M 1/72415 |
| 2018/0184180 A1* | 6/2018 | Reunamäki | H04N 5/77 |
| 2019/0007574 A1* | 1/2019 | Takarabe | H04W 52/0251 |
| 2019/0020730 A1* | 1/2019 | Singamsetty | H04W 4/50 |
| 2019/0053304 A1* | 2/2019 | Ikeda | H04W 8/005 |
| 2019/0200224 A1* | 6/2019 | Kinugawa | H04W 12/48 |
| 2019/0238391 A1* | 8/2019 | Kakeno | H04L 61/50 |
| 2019/0246357 A1* | 8/2019 | Cole | H04W 8/005 |
| 2019/0306711 A1* | 10/2019 | Golsch | H04W 4/80 |
| 2019/0327601 A1* | 10/2019 | Kwon | H04W 28/0215 |
| 2020/0296198 A1* | 9/2020 | Sasaki | H04M 1/6091 |
| 2021/0056181 A1* | 2/2021 | Sogawa | G06F 21/32 |
| 2021/0058757 A1* | 2/2021 | Lee | H03M 13/09 |
| 2021/0204137 A1* | 7/2021 | Wasily | H04L 67/104 |
| 2022/0060554 A1* | 2/2022 | Watanabe | H04L 67/561 |
| 2022/0368522 A1* | 11/2022 | Cheng | H04W 12/069 |
| 2022/0400365 A1* | 12/2022 | Bains | H04W 4/80 |
| 2023/0041669 A1* | 2/2023 | Zhang | H04W 8/005 |

\* cited by examiner

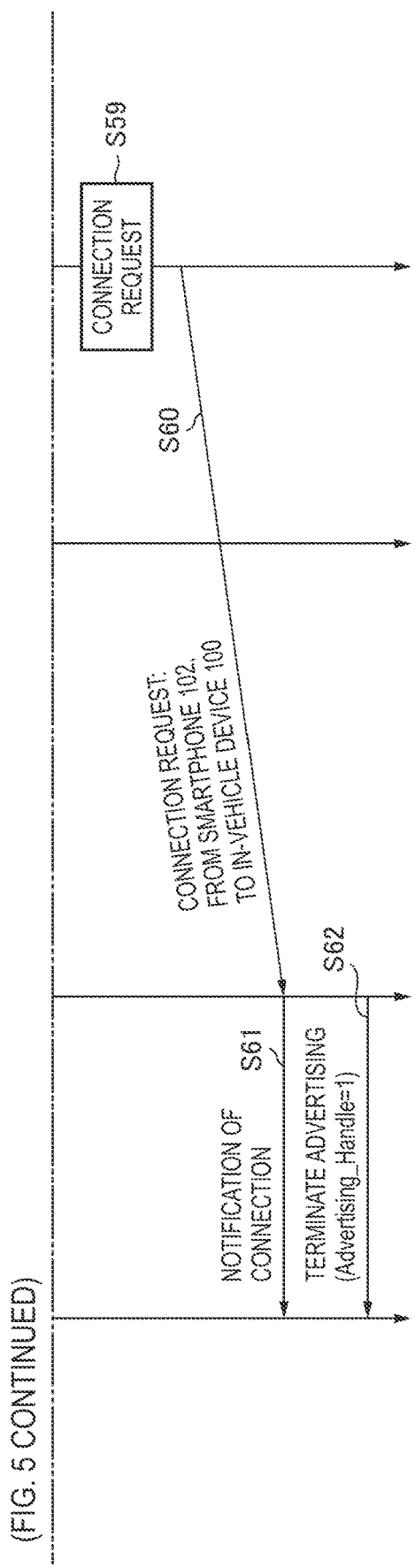

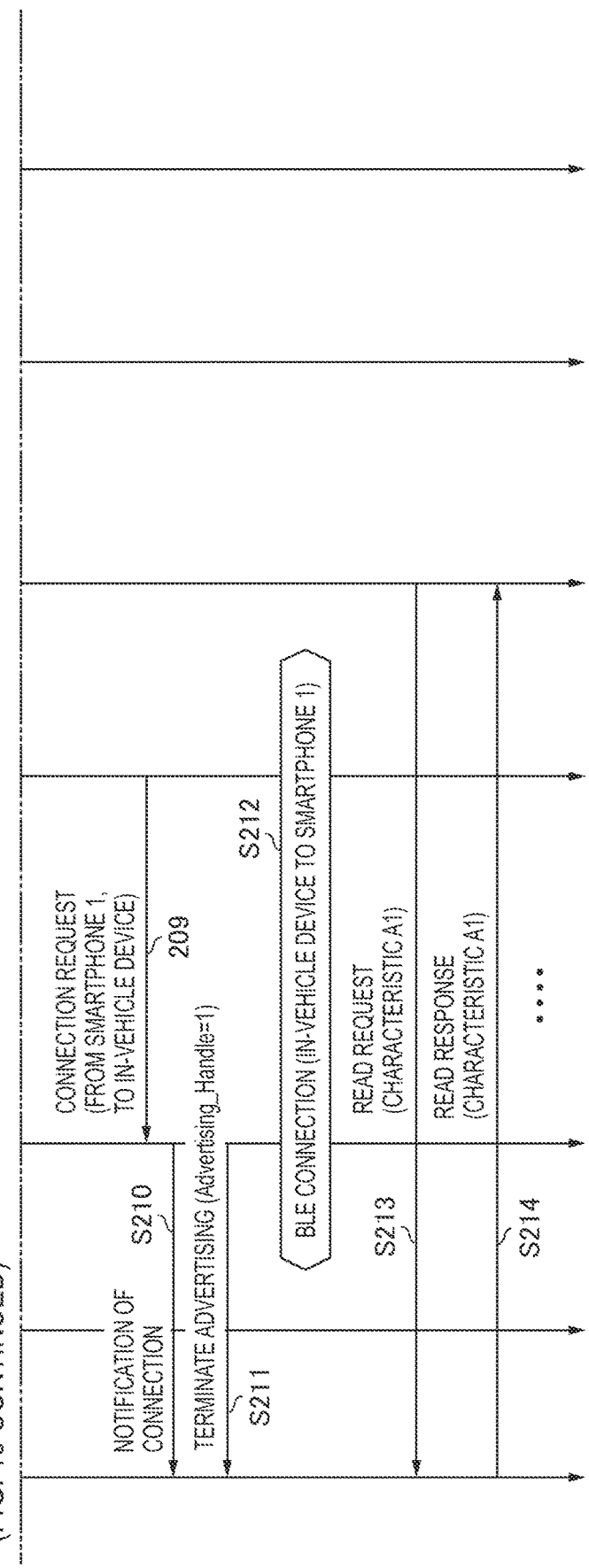

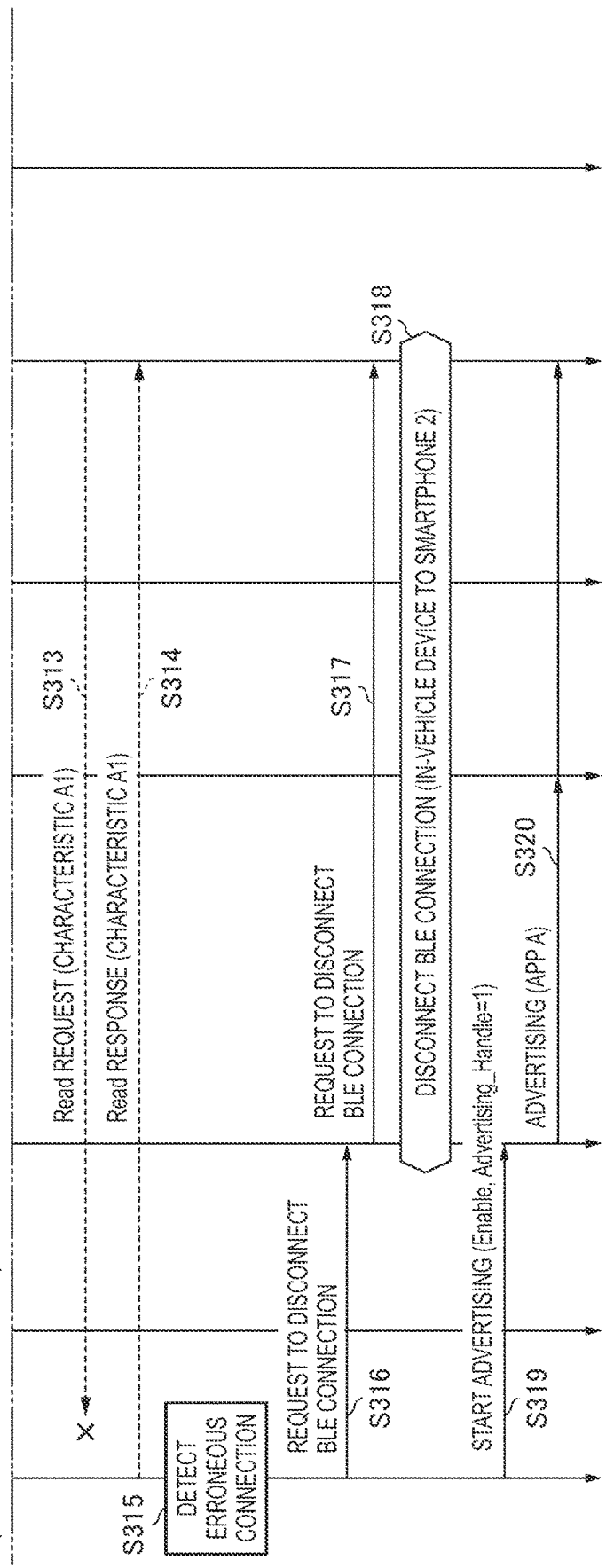

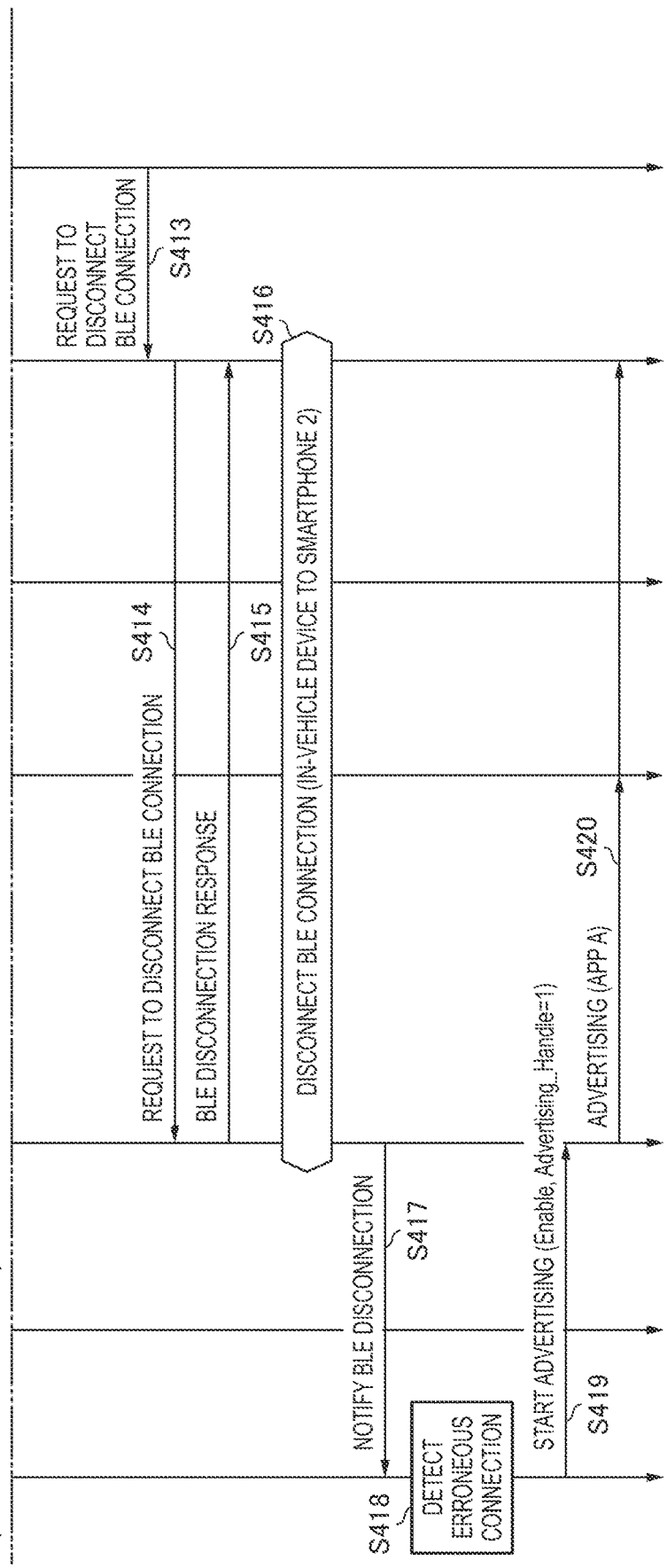

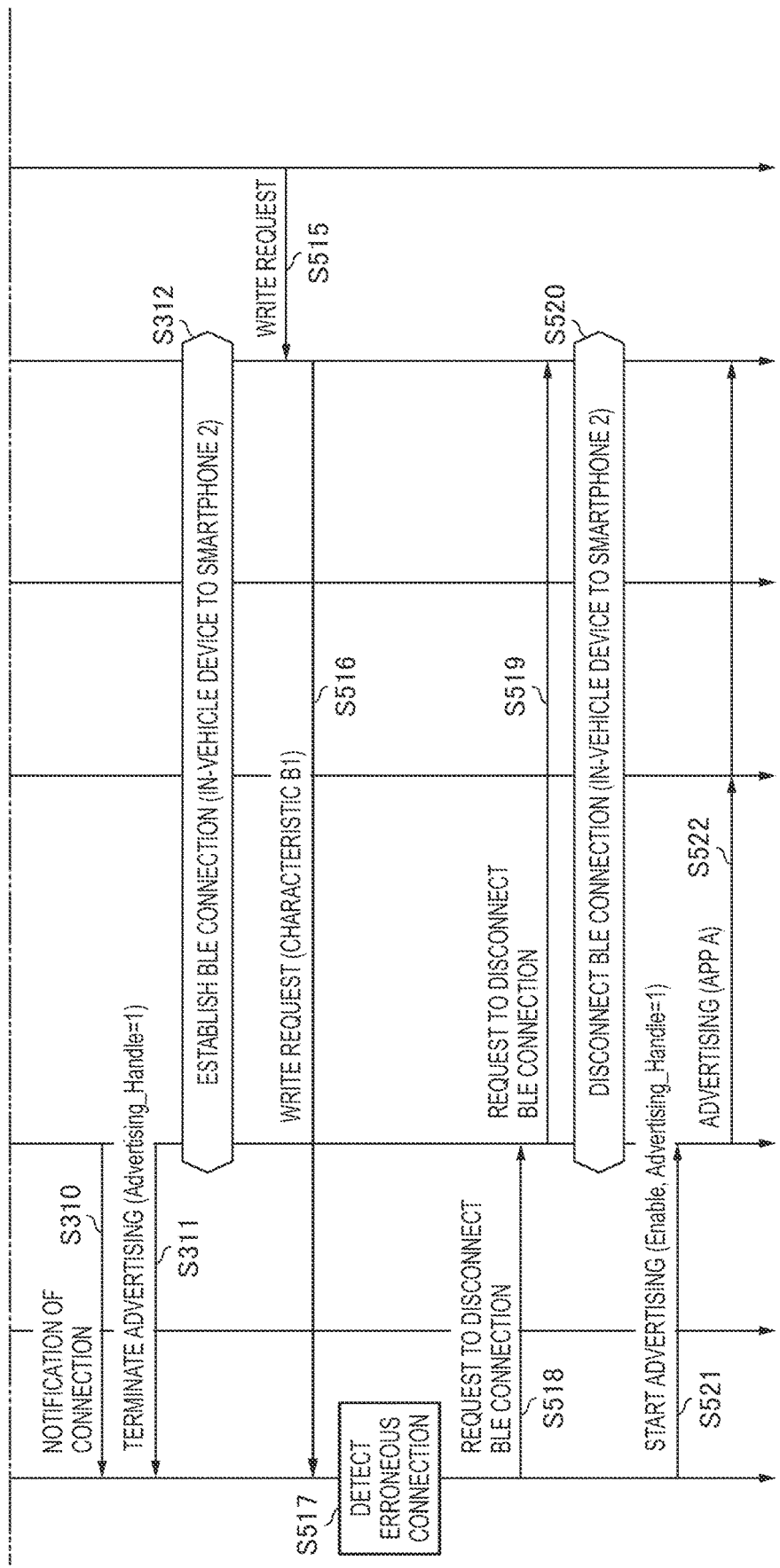

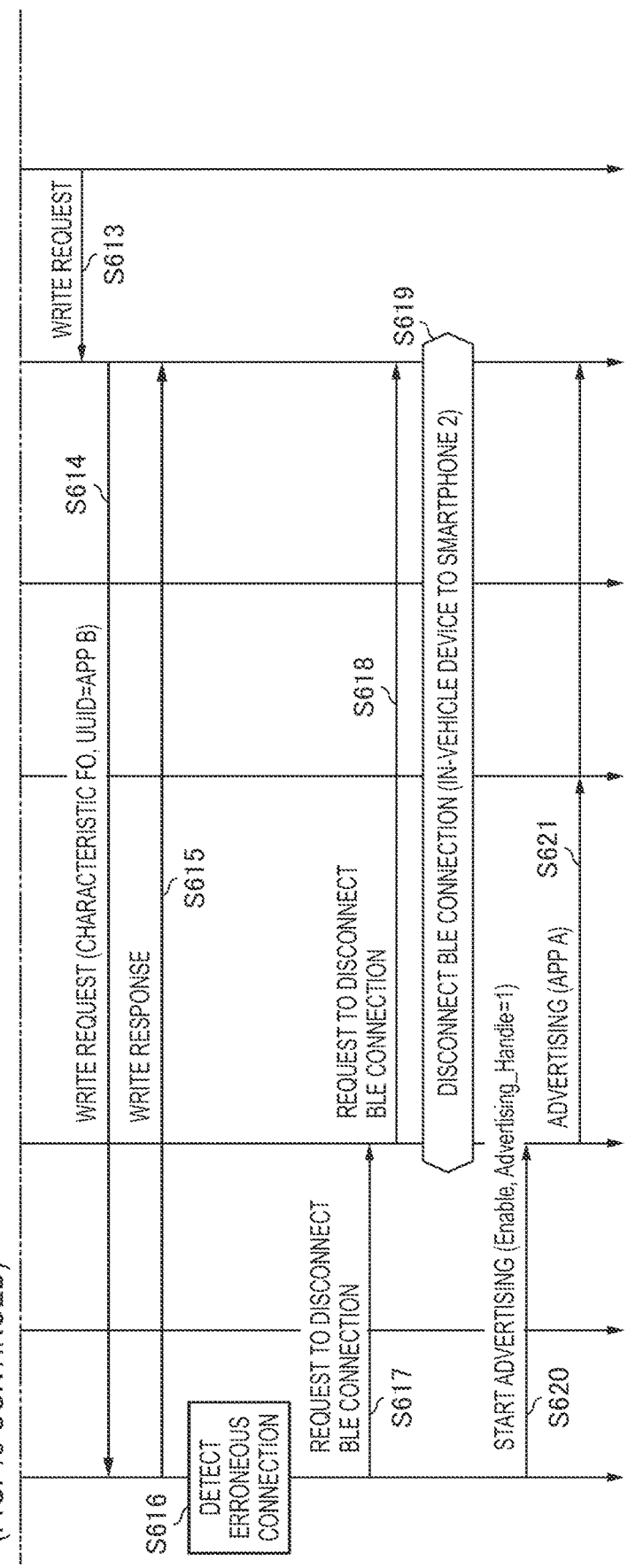

FIG. 22

| | ADVERTISING IDENTIFIER (Advertising_Handle) | NUMBER OF TIMES OF ERRONEOUS CONNECTION | FREQUENCY OF ERRONEOUS CONNECTION |
|---|---|---|---|
| UUID 1 (APPLICATION A) | 1 | 0 | 0 |
| UUID 2 (APPLICATION B) | 2 | 0 | 0 |

WIRELESS COMMUNICATION DEVICE AND WIRELESS COMMUNICATION METHOD

CROSS-REFERENCE TO RELATED APPLICATIONS

This application is based on and claims priority under 35 USC 119 from Japanese Patent Application No. 2022-071181 filed on Apr. 22, 2022, the entire content of which is incorporated herein by reference.

TECHNICAL FIELD

The present disclosure relates to a wireless communication device, a wireless communication method, and a computer program.

BACKGROUND ART

There is a technique for establishing a BLE connection by performing broadcast communication on surroundings and information based on Bluetooth Low Energy (registered trademark) standard. Hereinafter, Bluetooth (registered trademark) may be referred to as "BT", and the Bluetooth Low Energy may be referred to as "BLE".

Patent Literature 1 discloses a wireless communication device that, when a signal corresponding to at least one of a plurality of advertising packets having different advertising identifiers is received from another wireless communication device, terminates transmission of an advertising packet having an advertising identifier that corresponds to the signal.

CITATION LIST

Patent Literature

Patent Literature 1: JP2019-83485A

SUMMARY OF INVENTION

However, in the wireless communication device disclosed in Patent Literature 1, when connection is erroneously made to another wireless communication device which is not expected by the advertising identifier, transmission of the advertising packet that corresponds to the advertising identifier is terminated, and correct connection to another wireless communication device which is expected by the advertising identifier cannot be made.

The present disclosure is made in view of the above-described circumstances, and an object of the present disclosure is to provide a wireless communication device, a wireless communication method, and a computer program capable of correctly connecting to another wireless communication device expected by an advertising identifier.

The present disclosure provide a wireless communication device including a communication unit configured to perform wireless communication with other wireless communication devices, and a control circuit configured to control the communication unit. The control circuit is configured to set, in the communication unit, a different advertising identifier for each application. The communication unit is configured to repeatedly transmit an advertising packet that corresponds to the set advertising identifier and does not include the advertising identifier, receive a connection request transmitted from a first wireless communication device that is one of the other wireless communication devices that have received the advertising packet, terminate transmission of the advertising packet transmitted immediately before the connection request is received, and wirelessly connect to the first wireless communication device. The control circuit is further configured to determine whether the first wireless communication device is a connection destination expected by a first advertising identifier which is the advertising identifier that corresponds to the advertising packet whose transmission is terminated.

The present disclosure provide a wireless communication method based on a wireless communication device. The wireless communication method includes setting a different advertising identifier for each application, repeatedly transmitting an advertising packet that corresponds to the set advertising identifier and does not include the advertising identifier, receiving a connection request for wireless communication transmitted from a first wireless communication device that is one of other wireless communication devices that have received the advertising packet, terminating transmission of the advertising packet transmitted immediately before the connection request is received, wirelessly connecting to the first wireless communication device, and determining whether the first wireless communication device is a connection destination expected by a first advertising identifier which is the advertising identifier that corresponds to the advertising packet whose transmission is terminated.

General or specific aspects of the present invention may be implemented by a system, a device, a method, an integrated circuit, a computer program, or a recording medium, or may be implemented by any combination of a system, a device, a method, an integrated circuit, a computer program, and a recording medium.

The present invention has an effect of avoiding loss of a connection opportunity with a connection partner originally expected to be connected.

BRIEF DESCRIPTION OF DRAWINGS

Exemplary embodiment(s) of the present invention will be described in detail based on the following figures, wherein:

FIG. 22 is a diagram illustrating a management table for the advertising adjustment service program of the in-vehicle device according to the first modification to manage the number of times of erroneous connection and a frequency of erroneous connection for each application.

DESCRIPTION OF EMBODIMENTS

Hereinafter, embodiments specifically disclosing a wireless communication device, a wireless communication method, and a program according to the present disclosure will be described in detail with reference to the drawings as appropriate. However, the unnecessarily detailed description may be omitted. For example, the detailed description of already well-known matters and the repeated description of substantially the same configuration may be omitted. This is to avoid unnecessary redundancy of the following description and to facilitate understanding of those skilled in the art. The accompanying drawings and the following description are provided for those skilled in the art to fully understand the present disclosure, and are not intended to limit the subject matter described in the claims.

First Embodiment

Hereinafter, a wireless communication system according to a first embodiment of the present invention will be described with reference to the drawings.

Figure 1:
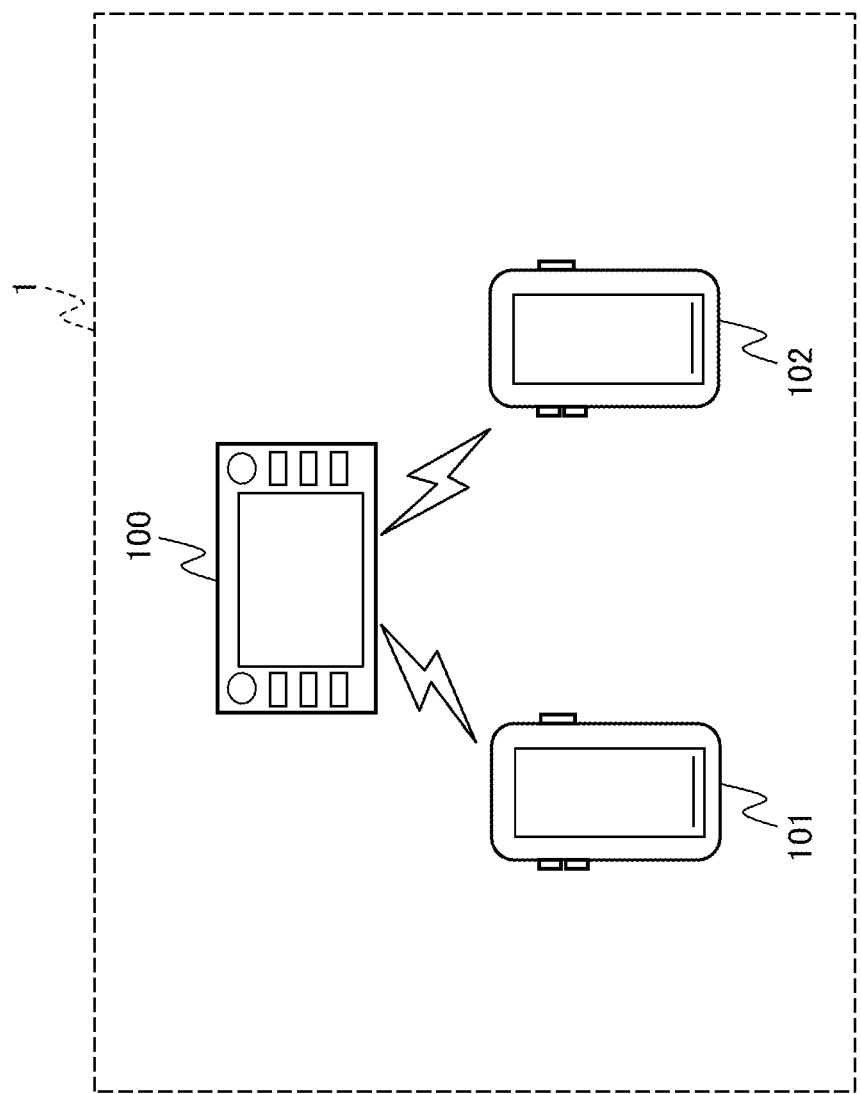
FIG. 1 illustrates a configuration of a wireless communication system according to a first embodiment of the present invention.

FIG. 1 is a diagram illustrating a configuration example of a wireless communication system 1 according to the first embodiment of the present invention.

In FIG. 1, the wireless communication system 1 includes an in-vehicle device 100, a smartphone 101, and a smartphone 102. The in-vehicle device 100 is an example of a wireless communication device. The smartphone 101 and the smartphone 102 are examples of other wireless communication devices. The in-vehicle device 100 wireless communication with the smartphone 101 or the smartphone 102 based on BLE. The BLE refers to a standard developed for a purpose of low power consumption in a near field communication standard called Bluetooth.

In the present embodiment, the in-vehicle device 100 operates as a peripheral that transmits an advertising packet to be described later. The smartphone 101 and the smartphone 102 operate as centrals that receive advertising packets. At least one of the smartphone 101 and the smartphone 102 receives the advertising packet transmitted by the in-vehicle device 100. At least one of the smartphone 101 and the smartphone 102 transmits a connection request to the in-vehicle device when an application identifier included in the received advertising packet conforms to an application included in the smartphone. As a result, at least one of the smartphone 101 and the smartphone 102 is BLE connected to the in-vehicle device 100. The BLE connection is a wireless communication connection using the BLE. In the wireless communication system 1, after the BLE connection, unique information is exchanged between an application included in the in-vehicle device 100 and the application included in the smartphone.

The smartphone 101 and the smartphone 102 are mobile terminals carried by a driver or an occupant, and are carried into or near a vehicle on which the in-vehicle device 100 is mounted. Other examples of the mobile terminal include a tablet terminal, a mobile phone, an audio player, and a smart watch. In addition, the mobile terminal is not limited thereto, and may be a device such as a remote controller installed in the vehicle.

Figure 2:
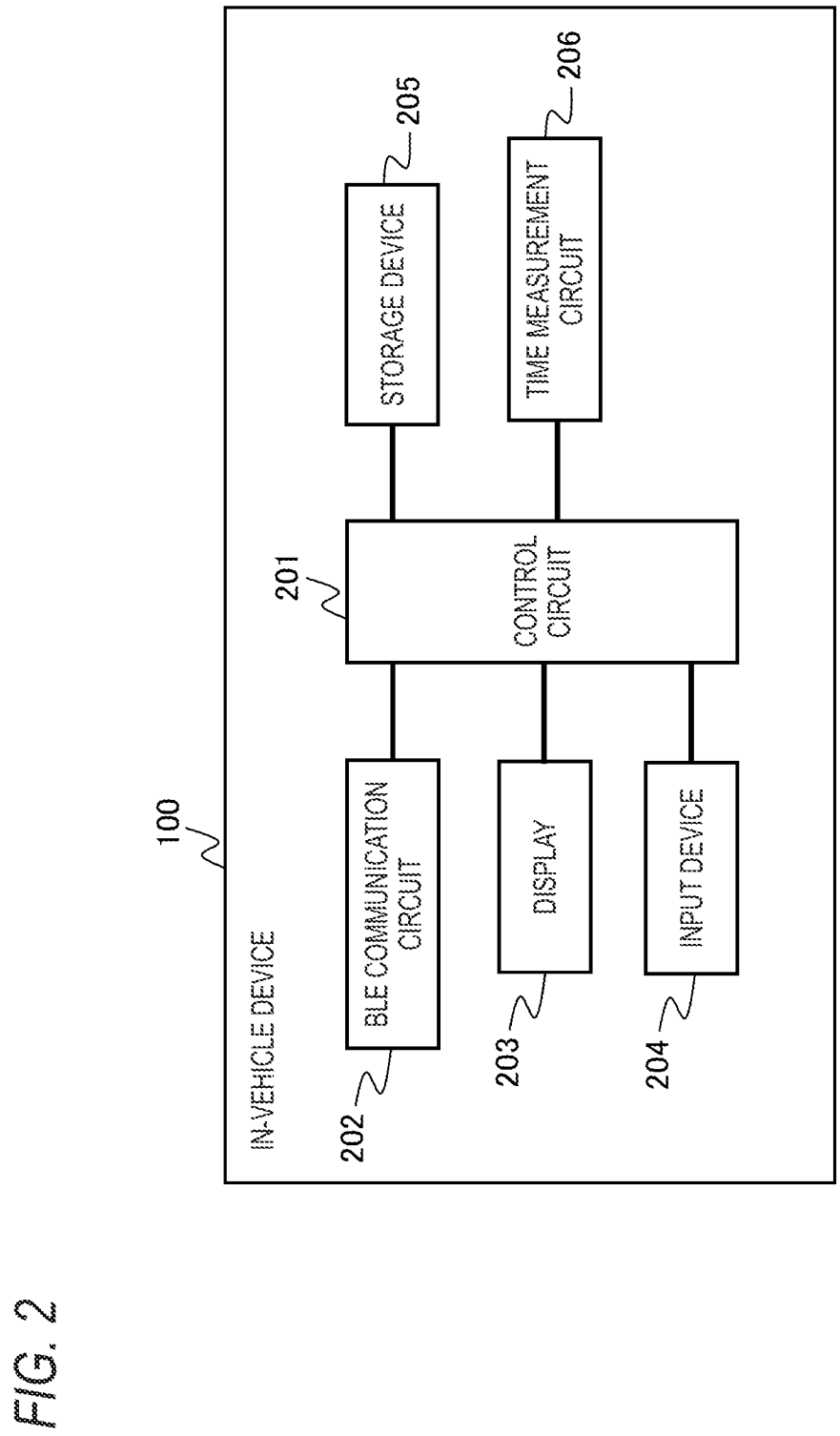
FIG. 2 is a block diagram illustrating a configuration of an in-vehicle device according to the first embodiment of the present invention.

Next, a hardware configuration of the in-vehicle device 100 according to the present embodiment will be described with reference to FIG. 2. FIG. 2 is a block diagram illustrating the hardware configuration of the in-vehicle device according to the first embodiment of the present invention. The in-vehicle device 100 includes a control circuit 201, a BLE communication circuit 202, a display 203, an input device 204, a storage device 205, and a time measurement circuit 206.

The control circuit 201 controls the overall operation of the in-vehicle device 100. The control circuit 201 includes one or more processors such as a central processing unit (CPU) and a micro processing unit (MPU), and a read only memory (ROM) or a random access memory (RAM). The control circuit 201 executes a program stored in the ROM to realize a process related to the present embodiment. In addition, the control circuit 201 uses the RAM as a work area during execution of the program. The ROM and the RAM may be provided outside the control circuit 201. The outside of the control circuit 201 is, for example, the storage device 205. The control circuit 201 may be implemented by an application specific integrated circuit (ASIC), a digital signal processor (DSP), a field-programmable gate array (FPGA), or the like in addition to or instead of the above-described hardware.

The BLE communication circuit 202 includes, for example, a radio frequency (RF) circuit, a baseband (BB) circuit, a link layer (LL) circuit, a memory circuit, and an antenna.

The BLE communication circuit 202 demodulates and decodes a wireless signal received via the antenna and transmits the wireless signal to the control circuit 201. In addition, the BLE communication circuit 202 performs encoding, modulation, and the like on a signal transmitted from the control circuit 201, and transmits the signal as a wireless signal via the antenna. The BLE communication circuit 202 performs wireless communication with another wireless communication device. In the present embodiment, the another wireless communication device is, for example, at least one of the smartphone 101 and the smartphone 102.

In the present embodiment, the BLE communication circuit 202 is implemented by a BT controller that transmits and receives wireless signals based on the BLE. The BT controller may be a combo module including Bluetooth and Wi-Fi (registered trademark). Alternatively, the BT controller may be a module including only Bluetooth.

The display 203 is, for example, a display device such as a liquid crystal display or an organic electro-luminescent (EL) display, and includes a circuit for drawing. The display 203 displays, for example, information related to an application and information received from the smartphone 101 and the smartphone 102.

The input device 204 is a device for inputting an instruction from a user. The input device 204 is implemented by a device adopting a configuration in which a predetermined number of pressing switches are arranged, a touch panel device, or the like. The instruction from the user is, for example, an instruction to connect to or disconnect from the smartphone. The input device 204 transmits an electrical signal corresponding to an input operation to the control circuit 201. For example, a touch sensor may be provided as the input device 204 so as to overlap a display panel of the display 203, and may form a touch panel together with the display panel. In this case, the touch sensor serving as the input device 204 detects a contact position and a contact mode related to a contact operation of the user on the touch sensor, and transmits a signal corresponding to the detected contact position and contact mode to the control circuit 201.

The storage device 205 stores a control program main body for the in-vehicle device 100 to perform control according to the present embodiment, initial setting data, and various types of variable data during execution of a control program. The storage device 205 is, for example, a ROM or a RAM.

The time measurement circuit 206 includes a transmission circuit, a frequency division circuit, a timing circuit, and the like, and measures a current time, and an expiration time from a start of a timer in the control program.

Although a hardware configuration of the smartphone is not illustrated, the smartphone may include a BLE communication circuit, a control circuit, and a storage device, similarly to the in-vehicle device 100.

Figure 3:
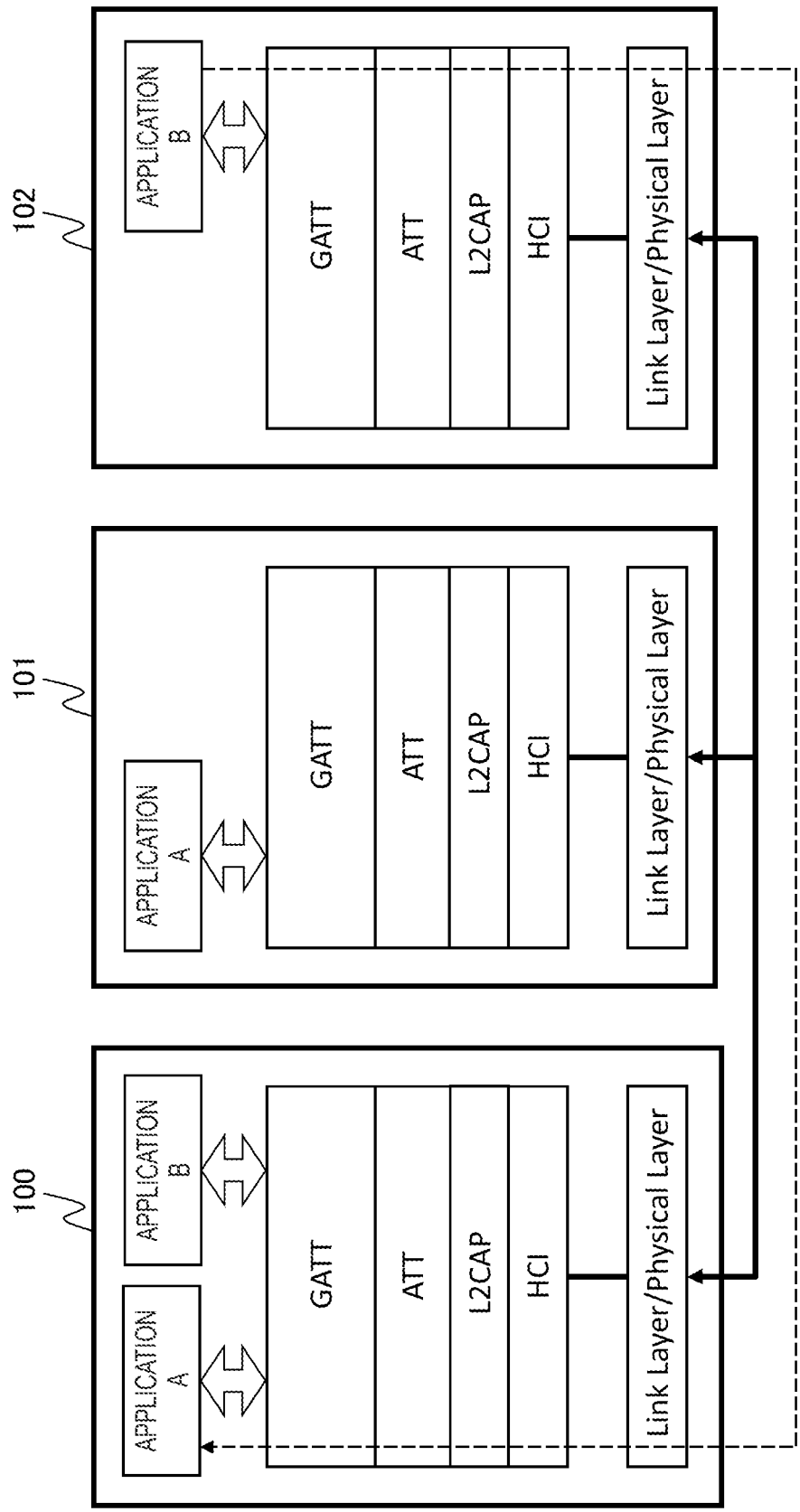
FIG. 3 is a diagram illustrating a hierarchical structure of a software program of the in-vehicle device according to the first embodiment of the present invention.

Next, software configurations of the in-vehicle device and the smartphone will be described. FIG. 3 is a diagram illustrating a hierarchical structure of software programs of the in-vehicle device and the smartphone according to the first embodiment of the present invention.

In FIG. 3, the in-vehicle device 100 is provided with software including an application A, an application B, a generic attribute profile (GATT), an attribute protocol (ATT), a logical link control and adaptation protocol (L2CAP), and a host controller interface (HCI). The GATT, the ATT, and the L2CAP are collectively referred to as a host stack. The software is executed by the control circuit 201.

A Link Layer and a Physical Layer are hardware and are BT controllers corresponding to the BLE communication circuit 202.

The smartphone 101 is provided with software including an application A, a GATT, an ATT, an L2CAP, and an HCI, and is BLE connected to the in-vehicle device 100 to implement a function of the application A. A Link Layer and a Physical Layer are hardware and are BT controllers of the smartphone 101.

The smartphone 102 is provided with software including an application B, a GATT, an ATT, an L2CAP, and an HCI, and is BLE connected to the in-vehicle device 100 to implement a function of the application B. A Link Layer and a Physical Layer are hardware and are BT controllers of the smartphone 102.

The HCI provides a command and an event interface for accessing the BT controller from the host stack. The HCI controls the BLE communication using an HCI command, an HCI event, and configuration parameters thereof.

The L2CAP is a protocol that provides functions such as division and reconfiguration of a communication packet of an upper layer protocol (ATT layer in FIG. 3).

ATT is a protocol that adopts a client server model and enables a server-side device to publish a set of an attribute and a related value thereof to a client-side device. In addition, with regard to attributes published by a server, at least one of detection, reading (Read), and writing (Write) can be executed by a client, and a series of exchanges instructed or notified by the server are defined. As the ATT, an enhanced attribute protocol (EATT) extended by BT5.2 may be used.

The GATT is a profile that adopts a client server model in the same manner as the ATT and defines a method of structuring data using the ATT and a method of exchanging information between applications. In a data structure of the GATT, components such as a profile, a service, and a characteristic are hierarchical.

In a GATT communication, two roles of a GATT client and a GATT server are defined based on a transfer source and a transfer destination of data.

The GATT client transmits a request to the GATT server and receives a response from the GATT server. The GATT client can execute at least one of reading (Read) and writing (Write) of information of the GATT server.

When the GATT server receives the request from the GATT client, the GATT server returns the response to the GATT client.

In the present embodiment, the in-vehicle device 100 is a GATT server, and the smartphone 101 and the smartphone 102 are GATT clients. The function of the application A is different from the function of the application B. Accordingly, a service and a characteristic of the application A are different from a service and a characteristic of the application B.

In FIG. 3, a dotted line illustrates a state where an erroneous connection occurs. The erroneous connection refers to a phenomenon in which the smartphone is erroneously connected to unintended advertising communication in a case where the in-vehicle device 100 simultaneously transmits a plurality of advertising. FIG. 3 illustrates an example in which the smartphone 102 having the application B is erroneously connected to the advertising communication of the application A of the in-vehicle device 100. When the erroneous connection occurs, a notification of connection with the smartphone 102 having the application B is notified to an application A side of the in-vehicle device 100. As a result, in the application A of the in-vehicle device 100, a mismatch of application occurs, and originally expected communication cannot be performed. The in-vehicle device 100 is connected to a device to which connection is not intended.

A process operation of the in-vehicle device 100 implemented as described above will be described below. First, with reference to FIGS. 4 to 7, a description will be given of a process operation for starting advertising corresponding to each application of the in-vehicle device 100 and a mechanism of occurrence of an erroneous connection between the in-vehicle device 100 and the smartphone.

Figure 4:
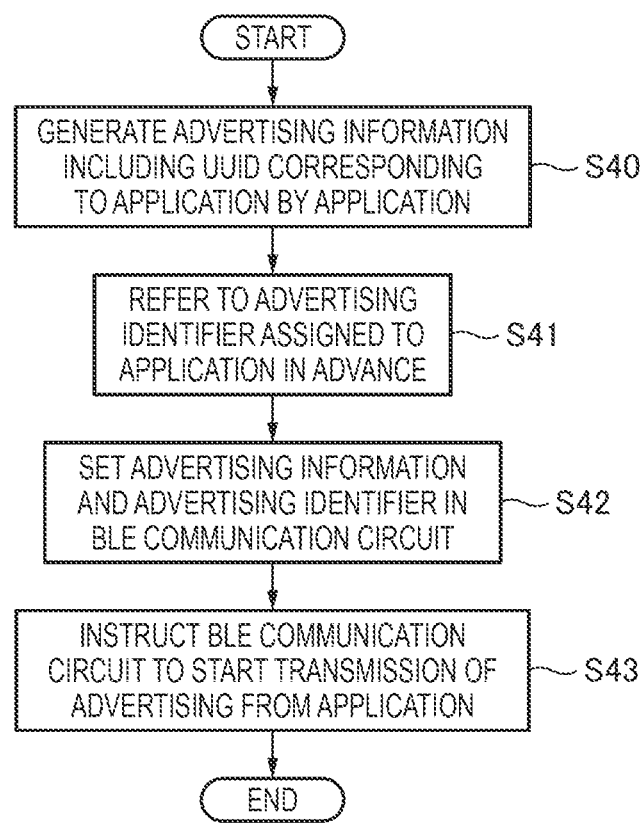
FIG. 4 is a flowchart of an advertising transmission process of the in-vehicle device according to the first embodiment of the present invention.

FIG. 4 is a flowchart in which the application of the in-vehicle device according to the first embodiment of the present invention performs an advertising transmission process. When a user gets on a vehicle (not illustrated) on which the in-vehicle device 100 is mounted and turns on an accessory (ACC) power supply (not illustrated), the in-vehicle device 100 is activated, and transmission of an advertising packet is simultaneously started by the control circuit 201. In addition, the vehicle may detect that a door of the vehicle is opened and transmit a detection signal to the in-vehicle device 100 via an in-vehicle network, and the in-vehicle device 100 may start transmitting the advertising packet at a reception timing of the detection signal. The application may start processes relating to the flowchart of FIG. 4 at any timing when the user instructs connection with the smartphone via the input device 204.

The application is executed by the control circuit 201. Therefore, the application may be read as the control circuit 201. Hereinafter, respective processes of the flowchart of FIG. 4 are executed by the application A of the in-vehicle device 100. The respective processes of the flowchart of FIG. 4 are similarly executed by the application B.

First, the application A generates advertising information including a universally unique identifier (UUID) corresponding to the application A (S40). Here, the UUID is a 128-bit identifier, and is an ID used as an application identifier for identifying each application in the present embodiment.

After the process of S40, the application A refers to an advertising identifier assigned to the application A in advance from the storage device 205 (S41). In the present embodiment, different advertising identifiers are assigned to respective applications. For example, "1" is assigned to the application A as a value of the advertising identifier, and "2" is assigned to the application B as the value of the advertising identifier. Incidentally, the value of the advertising identifier is an example and is not limited.

The control circuit 201 sets the advertising information and the advertising identifier in the BLE communication circuit 202 (S42). The application A instructs the BLE communication circuit 202 to start transmission of the advertising packet (S43).

Figure 5:
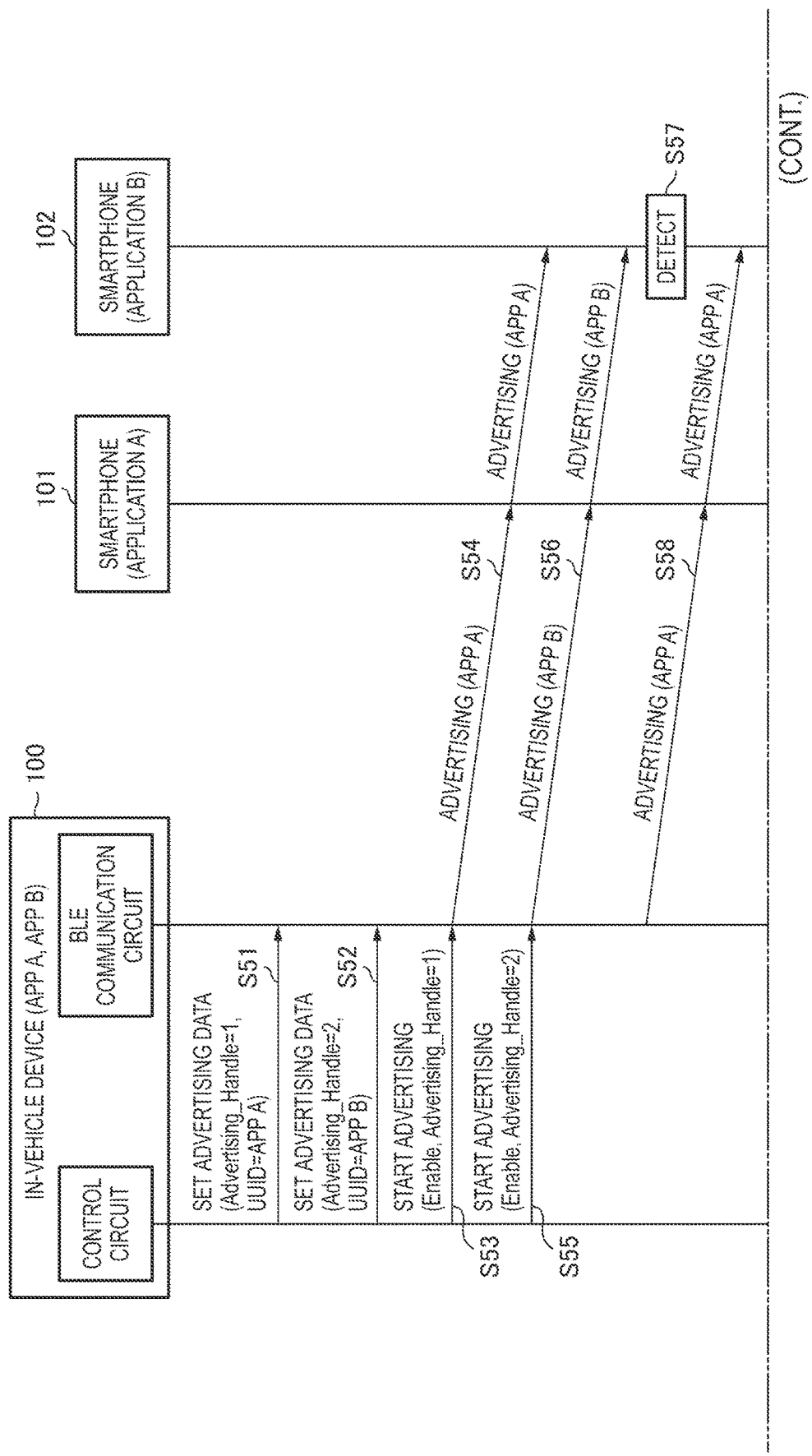
FIG. 5 is a sequence diagram illustrating a mechanism of occurrence of an erroneous connection between the in-vehicle device according to the first embodiment of the present invention and a smartphone.

FIG. 5 is a sequence diagram illustrating a mechanism of occurrence of an erroneous connection between the in-vehicle device and the smartphone.

In some parts of FIG. 5, the application A is referred to as App A, and the application B is referred to as App B.

First, the application A executed by the control circuit 201 sets advertising data to the BLE communication circuit 202 (S51). The setting of the advertising data is performed using, for example, an "LE Set Extended Advertising Data" command.

Figure 6:
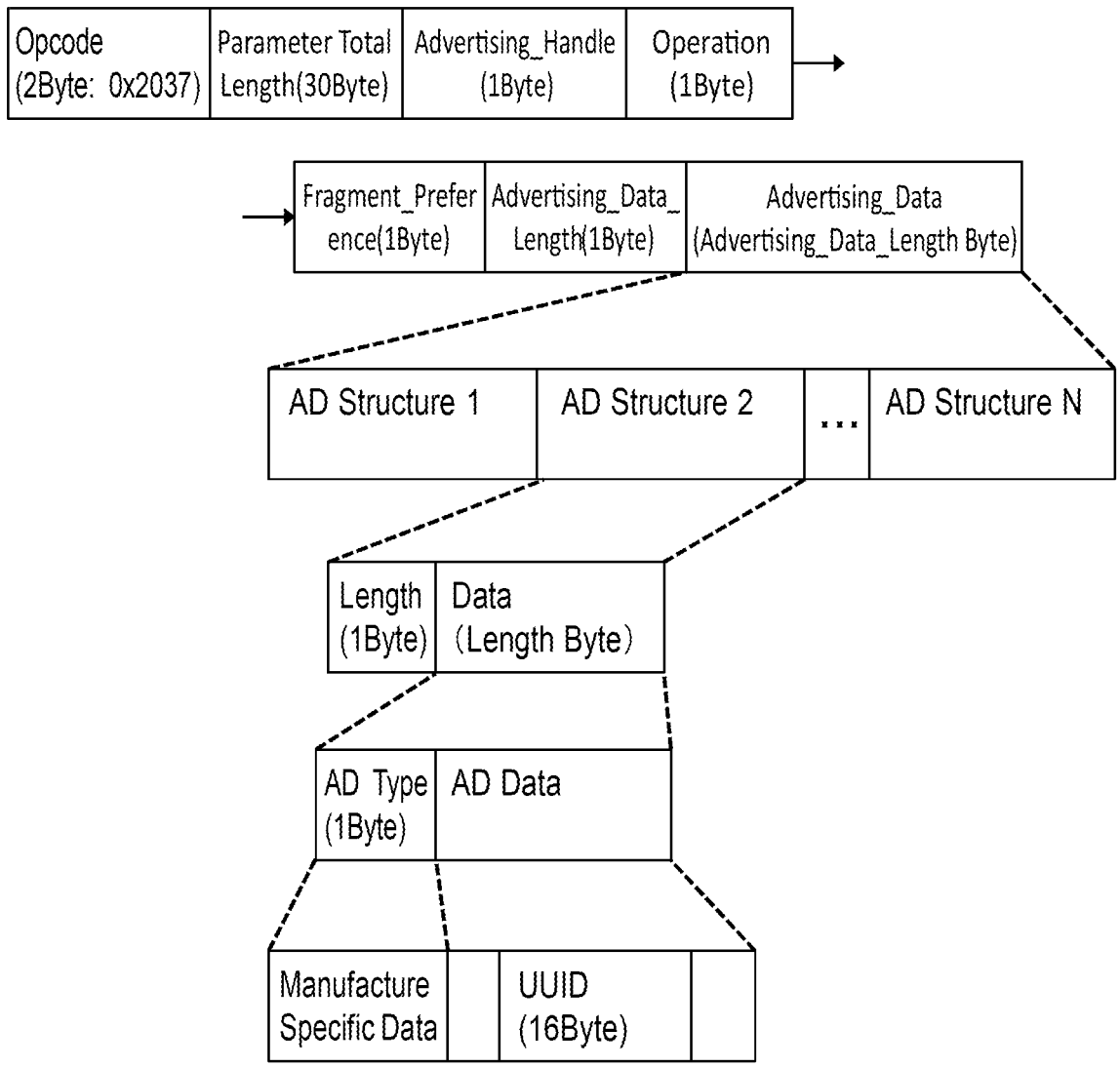
FIG. 6 is a diagram illustrating a configuration of an HCI command for setting advertising data to be transmitted from a host stack of the in-vehicle device to a Bluetooth controller.

Here, a configuration of an HCI command ("LE Set Extended Advertising Data" command) will be described with reference to FIG. 6. FIG. 6 illustrates the configuration of the HCI command for setting the advertising data transmitted from the host stack of the in-vehicle device 100 to the BT controller. As illustrated in FIG. 6, in the HCI command, a parameter "Advertising_Handle" representing the advertising identifier is defined. In the present embodiment, the HCI command includes AD Data whose AD Type is 0xFF ("Manufacture Specific Data"). The AD Type indicates the type of the AD Data. The "Manufacture Specific Data" indicates that the AD Data is data that can be optionally determined by a company. In the present embodiment, the AD Data includes a universally unique identifier (UUID) capable of identifying each application in the in-vehicle device 100.

Here, in the process of S51 in FIG. 5, the application A sets "1" for the value of "Advertising_Handle" and sets a value corresponding to the application A for the UUID. This is expressed as "Advertising_Handle=1, UUID=App A" in FIG. 5.

The application B included in the control circuit 201 sets advertising data to the BLE communication circuit 202 (S52). In the process of S52, the application B sets "2" for the value of "Advertising_Handle" and sets a value corresponding to the application B for the UUID. This is expressed as "Advertising_Handle=2, UUID=App B" in FIG. 5.

The application A included in the control circuit 201 instructs the BLE communication circuit 202 to start advertising (S53). The start of the advertising is set using the "LE Set Extended Advertising Enable" command. Specifically, the control circuit 201 sets "Enable" for a parameter "Enable" as a value representing a start of transmission, and sets "1" for the value of the parameter "Advertising_Handle" representing the advertising identifier. This is expressed as "Enable, Advertising_Handle=1" in FIG. 5.

The BLE communication circuit 202 receives the instruction to start the advertising in S53, and transmits an advertising packet including the UUID of the application A as a wireless signal (S54). The BLE communication circuit 202 repeatedly broadcasts the advertising packet at a predetermined cycle. As a result, other wireless communication devices present in the vicinity can detect the in-vehicle device 100. The other wireless communication devices are the smartphone 101 and the smartphone 102 in FIG. 5.

Figure 7:
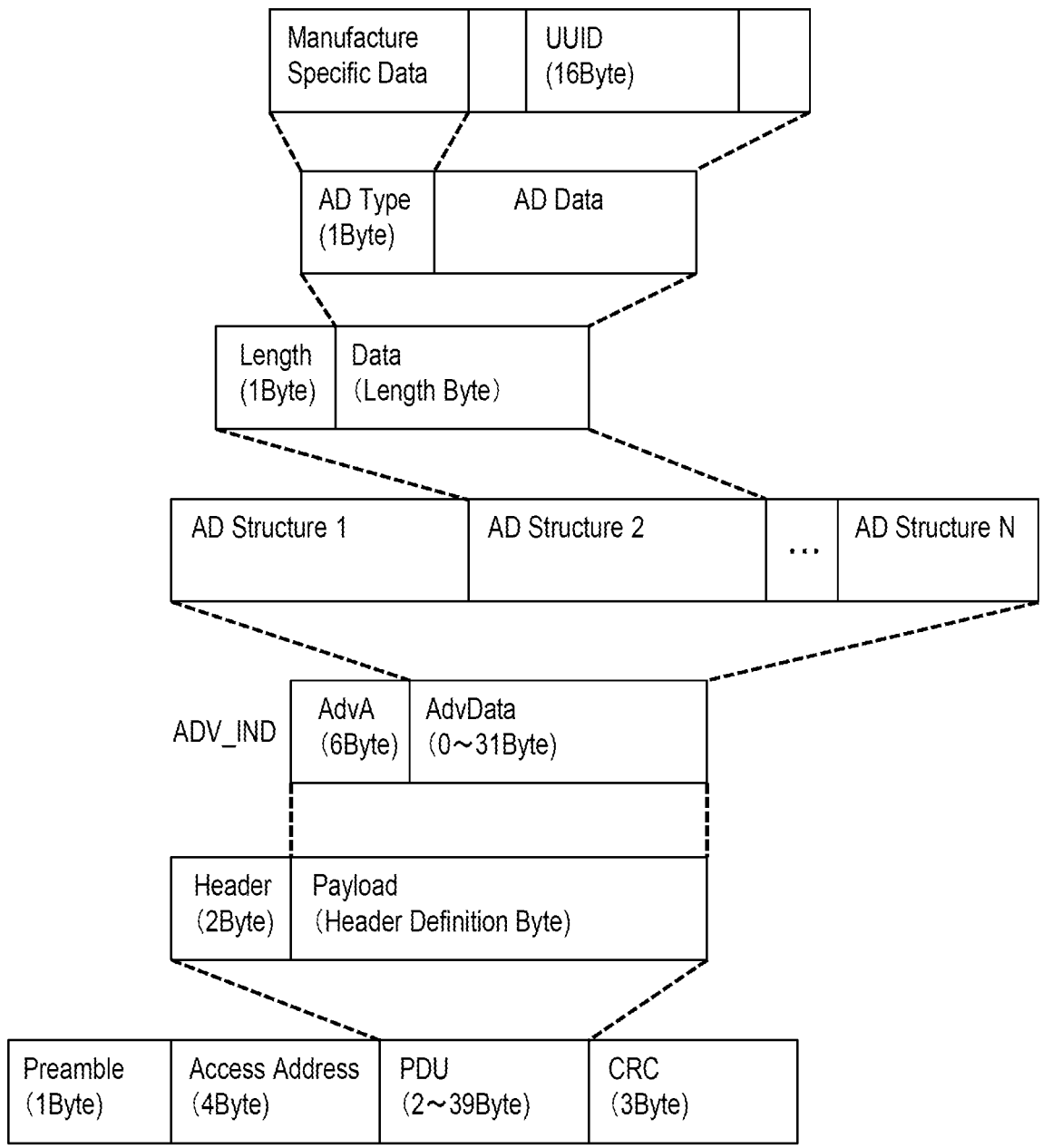
FIG. 7 is a diagram illustrating a configuration example of an advertising packet wirelessly transmitted by the Bluetooth controller of the in-vehicle device.

Here, a configuration example of the advertising packet transmitted by the BLE communication circuit 202 in wireless communication will be described with reference to FIG. 7. Here, "ADV_IND" is specified as the type of the advertising packet. The "ADV_IND" is a type of an advertising packet for causing an unspecified number of devices to know the presence of the in-vehicle device 100 and accepting a connection request thereof when the connection request is received. The same values are set for AD Type and AD Data in FIG. 7 as those set by the host stack in FIG. 6. Here, the "Advertising_Handle" which is a parameter representing an advertising identifier is not included in a packet configuration example in FIG. 7. Therefore, on a smartphone side, even when the advertising packet is received, the advertising identifier cannot be identified.

Although the "ADV_IND" is exemplified as the type of the advertising packet, the type of the advertising packet is not limited thereto, and advertising (AUX_ADV_IND or the like) with another type of connection may be selected.

The description returns to the process of S55 in FIG. 5. Here, the application B included in the control circuit 201 instructs the BLE communication circuit 202 to start advertising (S55). The start of transmission of the advertising packet is set using the "LE Set Extended Advertising Enable" command. Specifically, the control circuit 201 sets "Enable" for the parameter "Enable" as a value representing the start of transmission, and sets "2" for the value of the parameter "Advertising_Handle" representing the advertising identifier. This is expressed as "Enable, Advertising_Handle=2" in FIG. 5.

The BLE communication circuit 202 receives the instruction to start the advertising in S55, and transmits an advertising packet including the UUID of the application B as a wireless signal (S56).

Next, the smartphone 102 detects the advertising packet transmitted in the process of S56 (S57). When the advertising packet is detected in the process of S57, the smartphone 102 determines whether the UUID included in the advertising packet is the UUID of the application, that is, the UUID corresponding to the application B. When it is determined that the UUID included in the advertising packet matches the UUID of the application of the smartphone 102, the smartphone 102 transmits a connection request to the in-vehicle device 100. Since the UUID included in the advertising packet detected in the process of S57 matches the UUID of the smartphone 102, the smartphone 102 transmits the connection request to the in-vehicle device 100 (S59). The connection request is transmitted from a BLE communication circuit of the smartphone 102 to the BLE communication circuit 202, for example, as a communication packet referred to as "CONNECT_IND" (S60).

Here, the communication packet "CONNECT_IND" which is the connection request includes parameters InitA, AdvA, and LLData. The InitA is an address part indicating a connection request source. The AdvA is an address part indicating a connection request destination. The LLData is a connection communication parameter to be established. In FIG. 5, the address of the connection request source is expressed as From smartphone 102, and the address of the connection request destination is expressed as To in-vehicle device 100. An example of the connection request is not limited to the "CONNECT_IND" including InitA, AdvA, and LLData, and may be a communication packet (AUX_CONNECT_REQ or the like) that makes another type of connection request.

Here, it is assumed that the smartphone 102 receives the advertising packet including the UUID of the application A indicated in S58 immediately before performing the process related to the connection request in S59 and the process of transmitting the connection request in S60. In this case, the BLE communication circuit 202 erroneously recognizes that the received connection request in S60 is a connection request with respect to the advertising of the application A transmitted in S58 immediately before, that is, "Advertising_Handle=1".

Therefore, the BLE communication circuit 202 notifies the application A of the control circuit 201 that connection to the smartphone 102 is made (S61). Substantially simultaneously with the process of S61, the BLE communication circuit 202 terminates the transmission of the advertising packet of "Advertising_Handle=1" and notifies the application A of the control circuit 201 of the termination (S62). The termination of the transmission of the advertising packet is set by the BLE communication circuit 202 using an "LE Set Advertising Set Terminated" event. Event parameters of the "LE Set Advertising Set Terminated" event include the "Advertising_Handle" which is an advertising identifier, "Connection_Handle" which is a parameter for identifying a connection, and the like.

As described above, a side that executes the connection, that is, a smartphone 102 side can specify the address of the in-vehicle device 100 at the time of transmitting the connection request to the in-vehicle device 100, but cannot specify advertising with which advertising identifier is to be connected when the in-vehicle device 100 executes a plurality of advertising. As a result, an erroneous connection occurs.

The process of S51 and the process of S52 in FIG. 5 correspond to the process of S42 in FIG. 4. The process of S53 and the process of S55 in FIG. 5 correspond to the process of S43 in FIG. 4.

In the example of FIG. 6, it is described that the UUID capable of identifying each application in the in-vehicle device 100 is included in the "Manufacture Specific Data", but the present invention is not limited thereto, and the AD Type may be set to 0x07 ("Complete List of 128-bit Service Class UUIDs") and the UUID may be included in the AD Data.

When the erroneous connection as described above occurs, the advertising having the advertising identifier of "Advertising_Handle=1" assigned to the application A is terminated, and thus a connection opportunity between the in-vehicle device 100 and a connection partner (smartphone 101) originally expected to be connected is lost.

Next, a control method that can prevent an application of the in-vehicle device 100 from losing a connection opportunity with a connection partner expected to be connected even when an erroneous connection occurs will be described. Here, the application is software to be executed by the control circuit 201.

Figure 8:
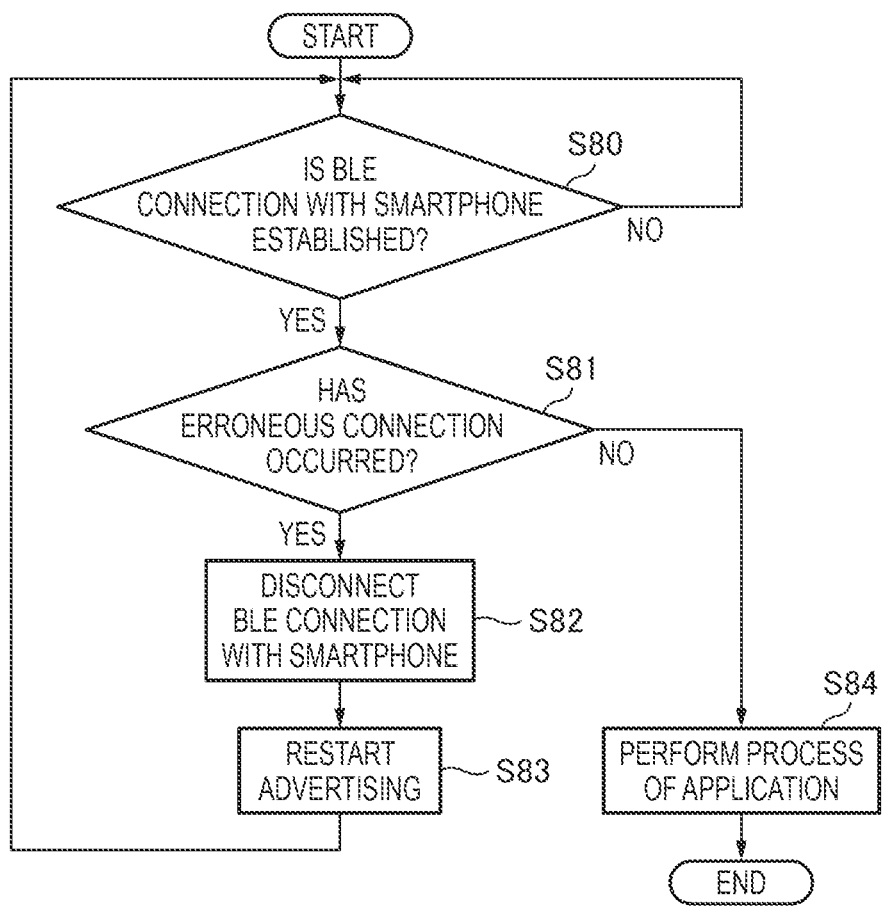
FIG. 8 is a flowchart in which an application program of the in-vehicle device according to the first embodiment of the present invention performs an advertising restart process control when an erroneous connection occurs.

FIG. 8 is a flowchart in which an application program of the in-vehicle device according to the first embodiment of the present invention performs an advertising restart process control when an erroneous connection occurs.

First, the application determines whether a BLE connection with the smartphone is established (S80). When it is determined that the BLE connection with the smartphone is not established (NO in S80), the application continues transmission of the advertising packet. In other words, the process of the application returns to the process of S80. When the application determines that the BLE connection with the smartphone is established (YES in S80), the process of the application proceeds to the process of S81.

The application determines whether an erroneous connection has occurred (S81). The process of S81 will be described in detail in descriptions of a first erroneous connection detection method, a second erroneous connection detection method, a third erroneous connection detection method, a fourth erroneous connection detection method, and a fifth erroneous connection detection method.

When the application determines that no erroneous connection has occurred (NO in S81), the in-vehicle device 100 is BLE connected to an intended smartphone, and thus a communication process related to the application is performed (S84). On the other hand, when the application determines that an erroneous connection has occurred (YES in S81), the BLE connection with the smartphone is disconnected (S82).

When the BLE connection with an unintended smartphone is disconnected in the process of S82, the application transmits an instruction of restarting the transmission of the terminated advertising packet to the BLE communication circuit 202. The BLE communication circuit 202 restarts the transmission of the advertising packet based on the instruction received from the application (S83). The BLE communication circuit 202 transmits a signal indicating that the transmission of the advertising packet has been restarted to the application. When the application receives the signal indicating that the transmission of the advertising packet has been restarted from the BLE communication circuit 202, the application executes the process of S80 again.

The process of S83 according to FIG. 8 corresponds to restarting the advertising of "Advertising_Handle=1" terminated due to the erroneous connection after the process of S62 in FIG. 5.

As a result, even when an erroneous connection occurs, it is possible to avoid loss of a connection opportunity with a connection partner originally expected to be connected by appropriately restarting the advertising of the terminated advertising identifier (Advertising_Handle).

<First Erroneous Connection Detection Method>

In the first erroneous connection detection method, the in-vehicle device 100 detects an erroneous connection based on that when a BLE connection is established between the in-vehicle device 100 and the smartphone, there is no access from the smartphone to a characteristic of the in-vehicle device 100. In addition, the in-vehicle device 100 may detect the erroneous connection when the access from the smartphone to the characteristic of the in-vehicle device 100 does not conform to the characteristic included in the application of the in-vehicle device 100.

Figure 9:
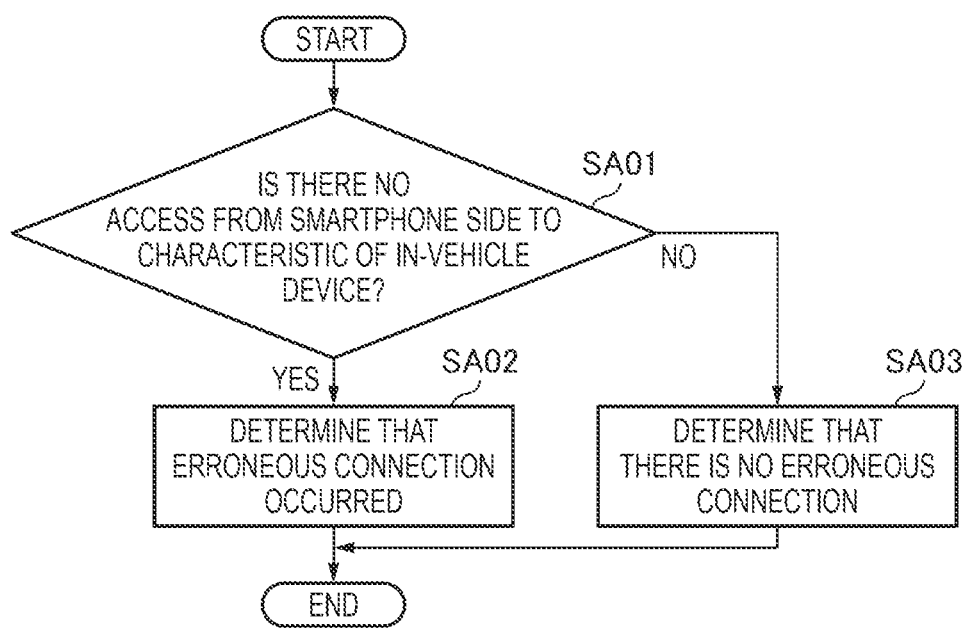
FIG. 9 is a flowchart of processes relating to a first erroneous connection detection method of the in-vehicle device.

Processes relating to the first erroneous connection detection method of the in-vehicle device will be described with reference to FIG. 9. FIG. 9 is a flowchart of the processes relating to the first erroneous connection detection method of the in-vehicle device. Each process of the flowchart according to FIG. 9 is executed by the control circuit 201.

The control circuit 201 determines whether there is an access from the smartphone side to the characteristic of the in-vehicle device 100 (SA01).

Here, the access refers to reading (Read) or writing (Write) of the characteristic, writing of a client configuration, or the like. The writing of the client configuration is performed in order to enable a notification from a client side when a data notification from a server is desired to be received in a case where there is a data update on a GATT server side. The data notification from the server is, for example, Characteristic Value Notification or Characteristic Value Indication.

When it is determined that there is no access from the smartphone side in the process of SA01 (YES in SA01), the control circuit 201 determines that an erroneous connection has occurred (SA02).

When it is determined that there is an access from the smartphone side in the process of SA01 (NO in SA01), the control circuit 201 determines that there is no erroneous connection (SA03).

Figure 10:
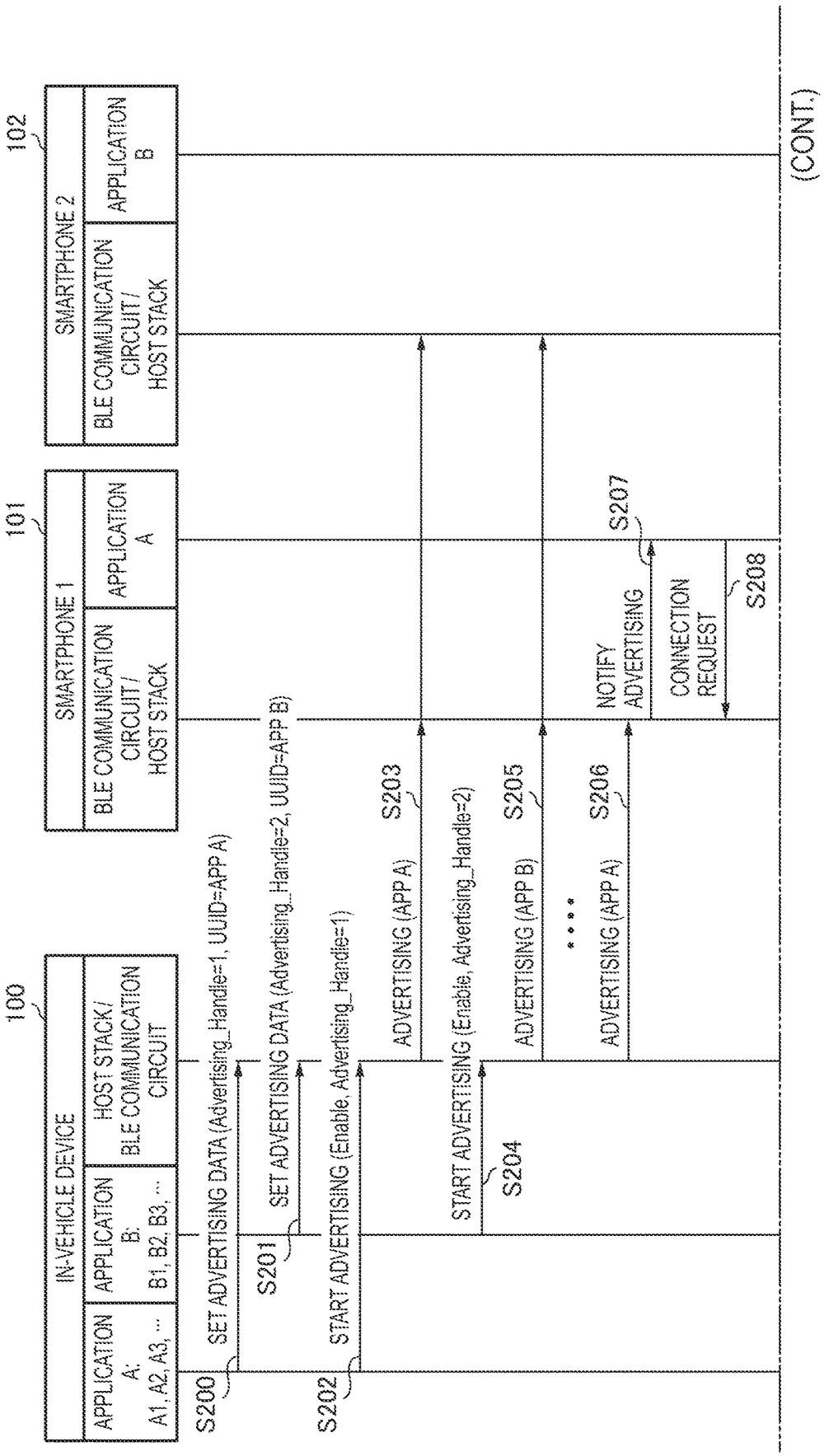
FIG. 10 is a sequence diagram in a case where an erroneous connection does not occur when a BLE connection is established between the in-vehicle device and a smartphone.

Next, processes in a case where an erroneous connection does not occur when a BLE connection is established between the in-vehicle device and the smartphone will be described with reference to FIG. 10. FIG. 10 is a sequence diagram in a case where an erroneous connection does not occur when the BLE connection is established between the in-vehicle device and the smartphone. In some parts of FIG. 10, the application A is referred to as App A, and the application B is referred to as App B.

The in-vehicle device 100 has two applications of the application A and the application B, and the two applications are executed by the control circuit 201. The application A has characteristics A1, A2, A3, . . . . The application B has characteristics B1, B2, B3, . . . .

The application A sets advertising data to the BLE communication circuit 202 (S200). The application A sets "1" for the value of "Advertising_Handle" and sets a value of the application A for the UUID. This is expressed as "Advertising_Handle=1, UUID=App A" in FIG. 10.

The application B sets advertising data to the BLE communication circuit 202 (S201). The application B sets "2" for the value of "Advertising_Handle" and sets a value of the application B for the UUID. This is expressed as "Advertising_Handle=2, UUID=App B" in FIG. 10.

The application A instructs the BLE communication circuit 202 to start advertising (S202). The start of the advertising, in other words, the start of transmission of the advertising packet is set using the "LE Set Extended Advertising Enable" command. Specifically, the application A sets "Enable" for the parameter "Enable" as a value representing the start of transmission, and sets "1" for the value of the parameter "Advertising_Handle" representing the advertising identifier. This is expressed as "Enable, Advertising_Handle=1" in FIG. 10.

The BLE communication circuit 202 transmits an advertising packet including the UUID of the application A as a wireless signal (S203). The advertising packet is broadcast at a predetermined cycle. Thereby, other wireless communication devices present in the vicinity of the in-vehicle device 100 can detect the in-vehicle device 100. The other wireless communication devices are the smartphone 101 and the smartphone 102 in FIG. 10.

The application B instructs the BLE communication circuit 202 to start advertising (S204). S204 is performed in the same manner as S202. The application B sets "Enable" for the parameter "Enable" as a value representing the start of transmission, and sets "2" for the value of the parameter "Advertising_Handle" representing the advertising identifier. This is expressed as "Enable, Advertising_Handle=2" in FIG. 10.

The BLE communication circuit 202 transmits an advertising packet including the UUID of the application B as a wireless signal (S205).

The BLE communication circuit of the smartphone 101 receives the advertising packet including the UUID of the application A (S206).

The BLE communication circuit of the smartphone 101 notifies the application A of the smartphone 101 that the advertising packet has been received (S207). The application A transmits a signal for causing the BLE communication circuit of the smartphone 101 to transmit a connection request to the in-vehicle device 100 (S208).

When the BLE communication circuit of the smartphone 101 acquires the signal related to the process of S208, the BLE communication circuit transmits the connection request to the in-vehicle device 100 (S209).

The BLE communication circuit 202 transmits a notification of connection with the smartphone 101 to the application A of the in-vehicle device 100 (S210).

Substantially simultaneously with the process of S210, the BLE communication circuit 202 terminates the transmission of the advertising packet of "Advertising_Handle=1". In addition, the BLE communication circuit 202 notifies the application A of the control circuit 201 that the transmission of the advertising packet is terminated (S211).

The BLE communication circuit 202 establishes a BLE connection with the BLE communication circuit of the smartphone 101 (S212).

Since the BLE connection with the in-vehicle device 100 is established in the process of S212, the smartphone 101 transmits a Read request of a characteristic A1 to the application A of the in-vehicle device 100 (S213). The process of S213 corresponds to an expected access from the smartphone side in the process of SA01 in FIG. 9. The request transmitted by the smartphone 101 in the process of S213 is not limited to the Read request.

The application A of the in-vehicle device 100 transmits a response to the Read request of the process of S213 to the smartphone 101 (S214).

An operation after the process of S214 is the process of S84 in FIG. 8.

Figure 11:
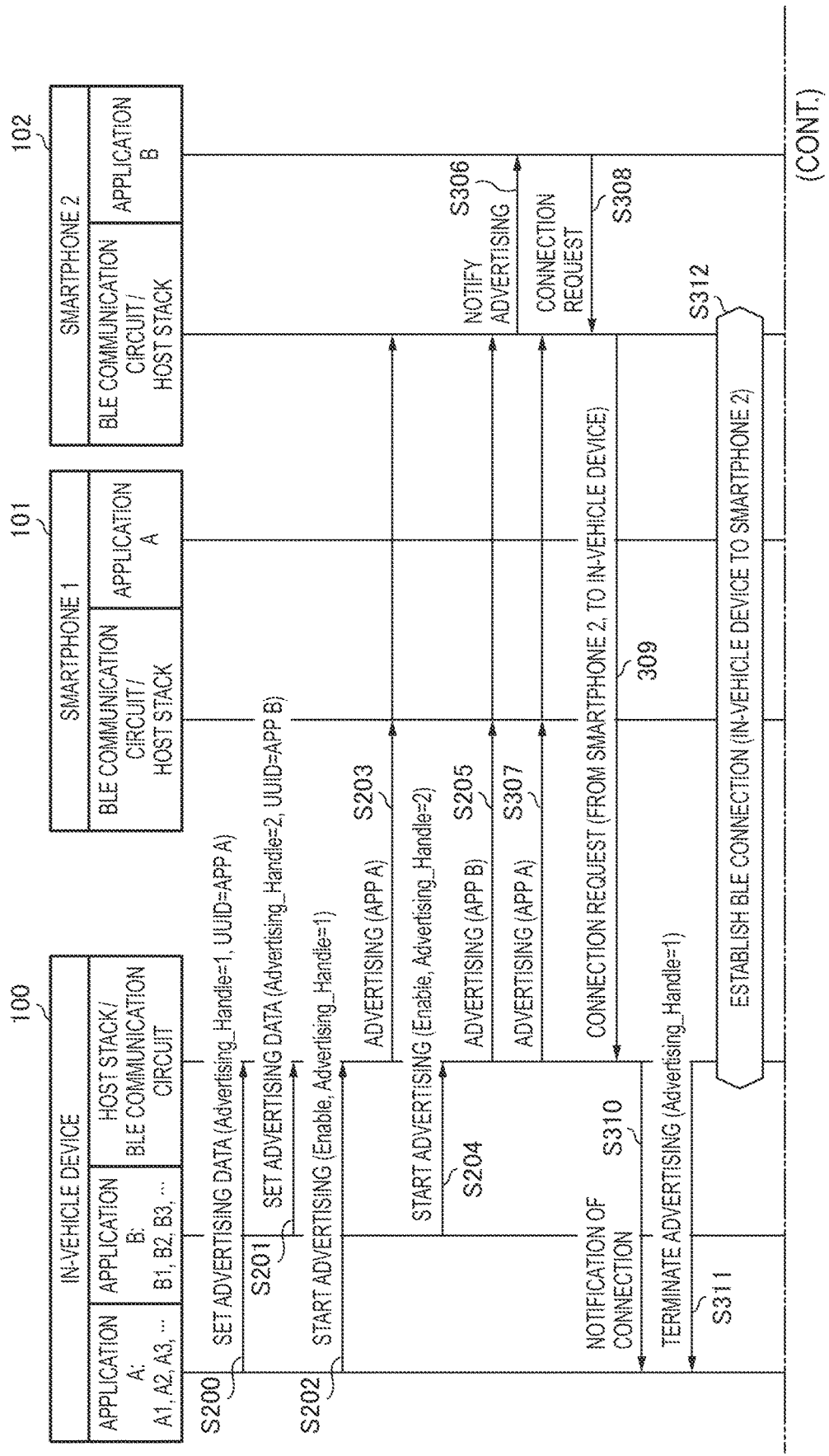
FIG. 11 is a sequence diagram in a case where an erroneous connection occurs when a BLE connection is established between the in-vehicle device and a smartphone.

Next, processes in a case where an erroneous connection occurs when a BLE connection is established between the in-vehicle device and the smartphone will be described with reference to FIG. 11. FIG. 11 is a sequence diagram in the case where the erroneous connection occurs when the BLE connection is established between the in-vehicle device and the smartphone. Regarding the processes in FIG. 11, the same processes as those in FIG. 10 are denoted by the same reference numerals, and descriptions thereof will be omitted. In some parts of FIG. 11, the application A is referred to as App A, and the application B is referred to as App B.

When the BLE communication circuit of the smartphone 102 receives the advertising packet related to the application B from the in-vehicle device 100 in the process of S205, the BLE communication circuit notifies the application B of the smartphone 102 that the advertising packet has been received (S306).

The application B of the smartphone 102 transmits an instruction of causing the BLE communication circuit of the smartphone 102 to transmit a request for connection with the in-vehicle device 100 (S308). The BLE communication circuit of the smartphone 102 transmits the connection request to the in-vehicle device 100 (S309).

When the BLE communication circuit of the smartphone 102 receives the advertising packet of the application A from the in-vehicle device 100 immediately before the process related to the connection request in S308 and the process of transmitting the connection request in S309 (S307), the BLE communication circuit 202 erroneously recognizes the connection request received in S309 as a request for advertising of the application A, that is, "Advertising_Handle=1".

The BLE communication circuit 202 transmits a notification of connection to the application A based on the process of S309 (S310). The BLE communication circuit 202 terminates the transmission of the wireless signal of the advertising packet. In addition, the BLE communication circuit 202 notifies the application A of the control circuit 201 that the transmission of the advertising packet is terminated (S311).

A BLE connection is established between the in-vehicle device 100 and the smartphone 102 (S312).

The application A of the in-vehicle device 100 and the smartphone 102 having the application B are connected to each other. Therefore, an expected access is not transmitted from the smartphone 102 side to the in-vehicle device 100. Here, the expected access is access to the application A of the in-vehicle device 100, and is, for example, a Read request of the characteristic A1 from the application A of the smartphone 101 (S313). Since the process of S313 is not actually performed, transmission (S314) of a Read response from the in-vehicle device 100 to the smartphone 101, which is a response to the process of S313, is also not performed.

The in-vehicle device 100 detects the erroneous connection based on that there is no expected access from the smartphone 102 side (S315).

The application A of the in-vehicle device 100 requests the BLE communication circuit 202 to disconnect the BLE connection (S316).

The BLE communication circuit 202 transmits the request to disconnect the BLE connection to the smartphone 102 (S317).

The BLE connection between the in-vehicle device 100 and the smartphone 102 is disconnected (S318).

The application A of the in-vehicle device 100 starts transmission of the terminated advertising packet (S319).

The BLE communication circuit 202 transmits the advertising packet including the UUID of the application A as a wireless signal (S320).

As a result, in the first erroneous connection detection method, the erroneous connection is detected based on that when a BLE connection is established between the in-vehicle device 100 and the smartphone, there is no expected access from the smartphone side.

<Second Erroneous Connection Detection Method>

In the second erroneous connection detection method, when the wireless connection is disconnected from the smartphone, the in-vehicle device 100 detects that the in-vehicle device 100 is not connected to the connection destination expected by the application of the in-vehicle device 100 but erroneously connected to an unintended device. In this case, the process of S82 in FIG. 8 can be omitted.

Figure 12:
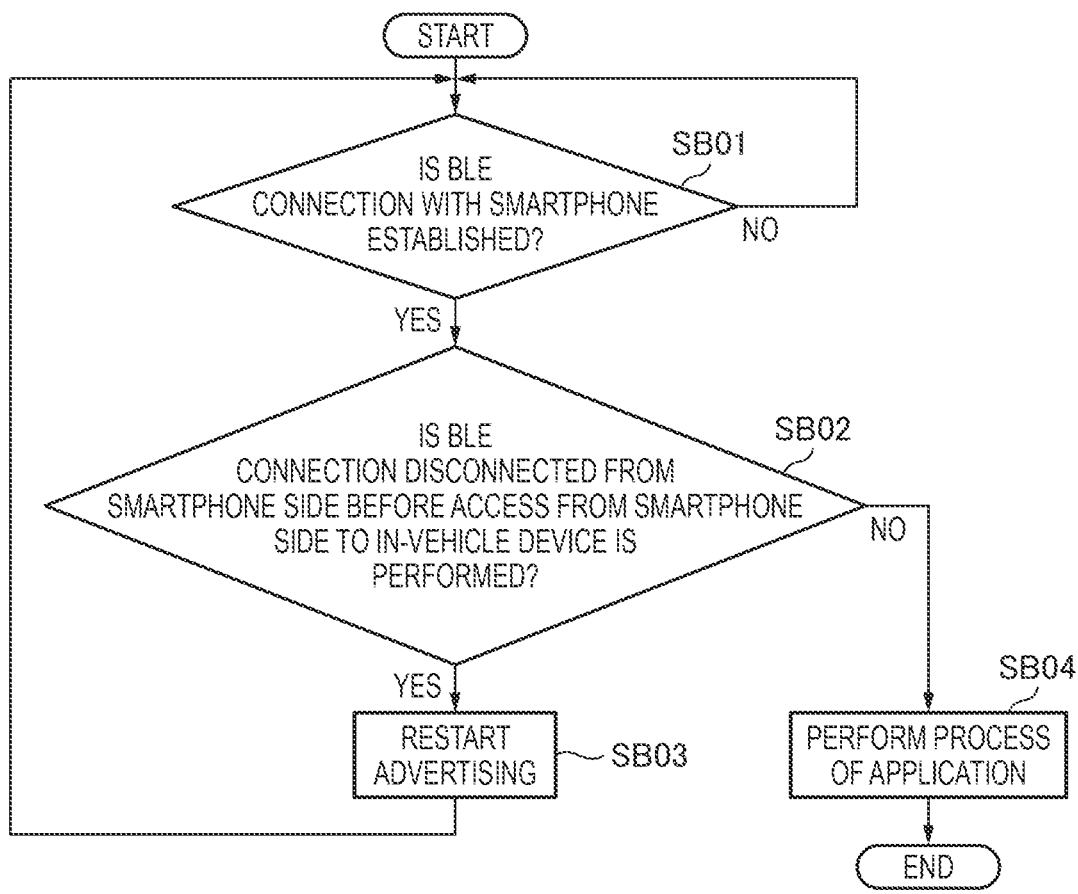
FIG. 12 is a flowchart of processes relating to a second erroneous connection detection method of the in-vehicle device.

Processes relating to the second erroneous connection detection method of the in-vehicle device will be described with reference to FIG. 12. FIG. 12 is a flowchart of the processes relating to the second erroneous connection detection method of the in-vehicle device. Each process of the flowchart according to FIG. 12 is executed by the control circuit 201.

The control circuit 201 determines whether a BLE connection with the smartphone is established (SB01). When the control circuit 201 determines that the BLE connection with the smartphone is not established (NO in SB01), the process returns to SB01.

When the control circuit 201 determines that the BLE connection with the smartphone is established (YES in SB01), the process proceeds to SB02.

The control circuit 201 determines whether the BLE connection is disconnected from the smartphone side before the access from the smartphone side to the in-vehicle device 100 is performed (SB02).

When it is determined that the BLE connection is disconnected from the smartphone side in the process of SB02 (YES in SB02), the control circuit 201 determines that an erroneous connection has occurred and restarts the transmission of the terminated advertising packet (SB03).

When it is not determined that the BLE connection is disconnected from the smartphone side in the process of SB02 (NO in SB02), the control circuit 201 starts an application process (SB04).

Figure 13:
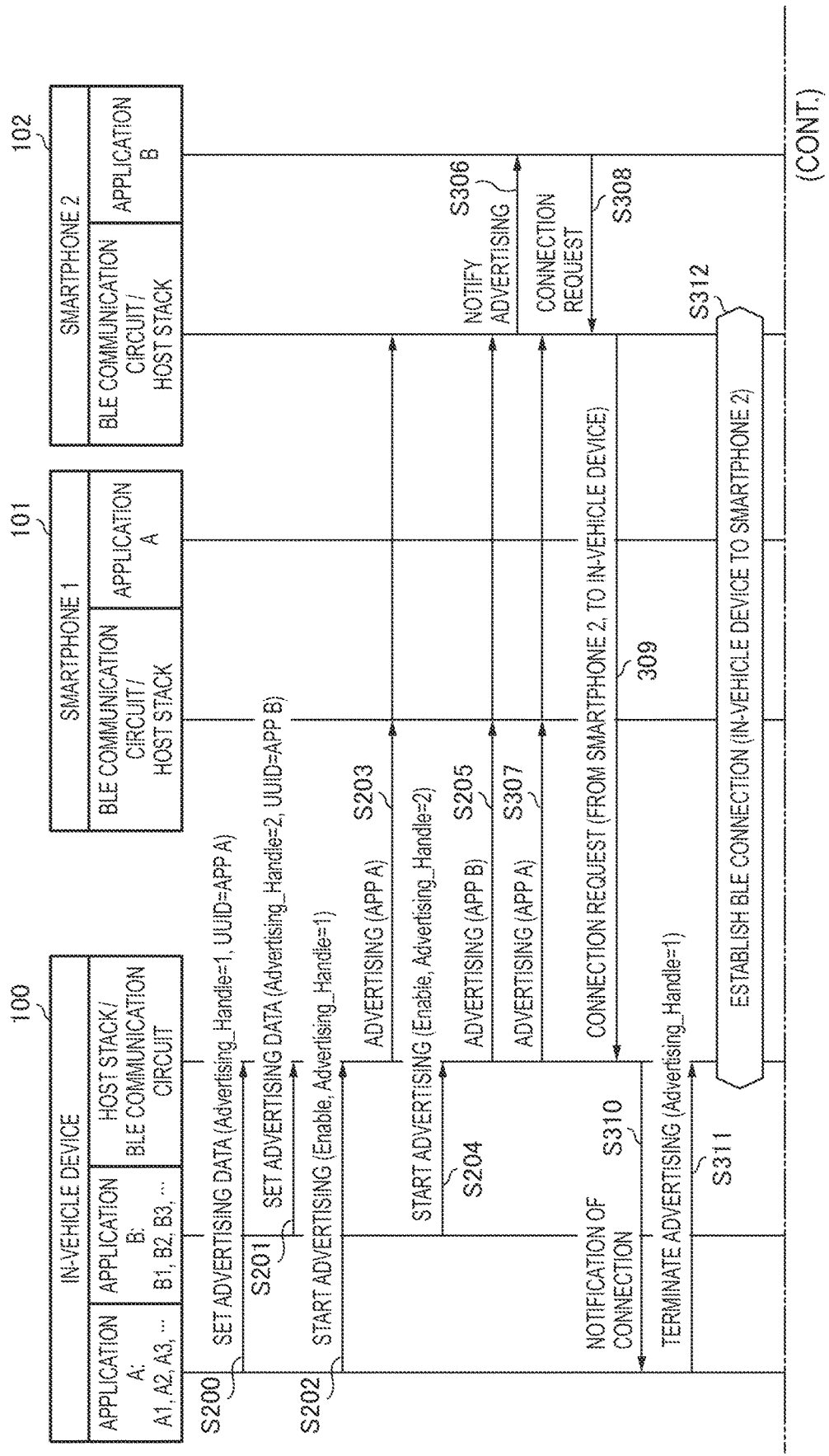
FIG. 13 is a sequence diagram in the case where the erroneous connection occurs when the BLE connection is established between the in-vehicle device and the smartphone.

Next, processes in a case where an erroneous connection occurs when a BLE connection is established between the in-vehicle device 100 and the smartphone will be described with reference to FIG. 13. FIG. 13 is a sequence diagram in the case where the erroneous connection occurs when the BLE connection is established between the in-vehicle device 100 and the smartphone. Regarding the processes in FIG. 13, the same processes as those in FIG. 11 are denoted by the same reference numerals, and descriptions thereof will be omitted. In some parts of FIG. 13, the application A is referred to as App A, and the application B is referred to as App B.

When the BLE connection is established between the in-vehicle device 100 and the smartphone 102 in the process of S312, the smartphone 102 searches a characteristic of the application B for the application connected to the in-vehicle device 100. When the application of the in-vehicle device 100 to which the BLE connection is established does not have the characteristic corresponding to the application B, the application B of the smartphone 102 transmits an instruction of transmitting a request to disconnect the BLE connection to the BLE communication circuit of the smartphone 102 (S413).

The BLE communication circuit of the smartphone 102 transmits the request to disconnect the BLE connection to the BLE communication circuit 202 (S414).

The BLE communication circuit 202 transmits a disconnection response with respect to the disconnection request in S414 to the BLE communication circuit of the smartphone 102 (S415).

The BLE connection between the in-vehicle device 100 and the smartphone 102 is disconnected (S416).

The BLE communication circuit 202 notifies the application A that the BLE connection has been disconnected (S417).

The application A of the in-vehicle device 100 detects the erroneous connection based on the process of S417 (S418).

The application A of the in-vehicle device 100 starts the transmission of the terminated advertising packet (S419).

The BLE communication circuit 202 transmits the advertising packet including the UUID of the application A as a wireless signal (S420).

As a result, in the second erroneous connection detection method, the erroneous connection is detected depending on whether the BLE connection is disconnected from the smartphone side.

<Third Erroneous Connection Detection Method>

In the third erroneous connection detection method, a plurality of applications included in the in-vehicle device 100 exchange characteristics of the respective applications among the plurality of applications in advance. Regarding the application of the in-vehicle device 100, when access to the characteristic from the smartphone conforms to the characteristic of the application of another in-vehicle device 100, the in-vehicle device 100 detects an erroneous connection with a device other than a device that is originally intended to be connected.

More specifically, characteristic information of the application A of the in-vehicle device 100 is notified to the application B, and characteristic information of the application B is notified to the application A. The application A and the application B exchange the characteristic information with each other before starting an advertising transmission, thereby determining which application the characteristic accessed from the smartphone side is directed to. Accordingly, when the characteristic is not directed to the application A, the application A detects that the device is not the device intended to be connected. The same applies to the application B.

Figure 14:
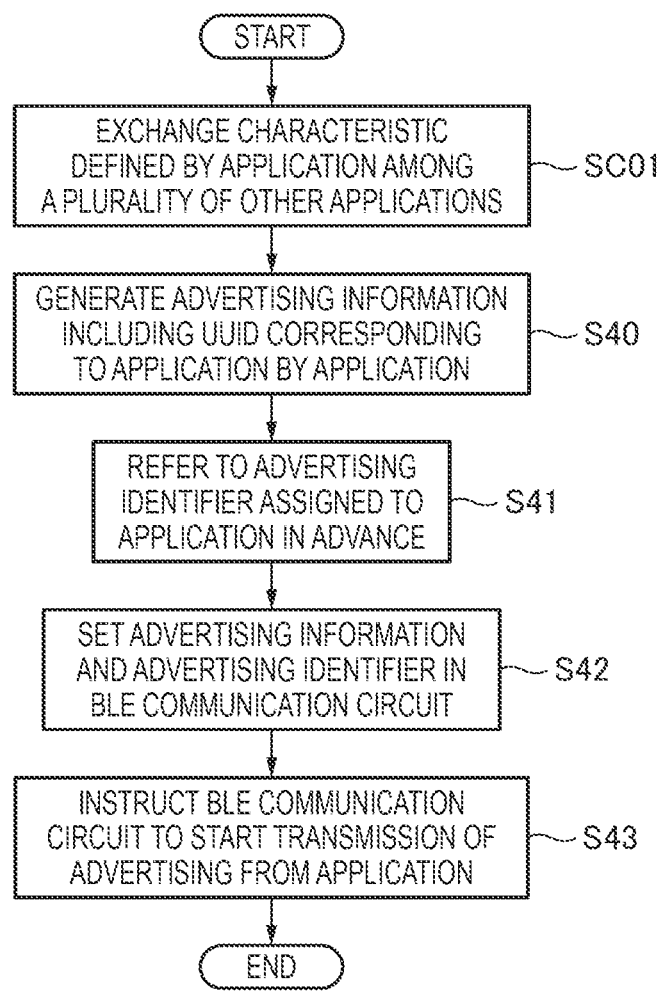
FIG. 14 is a flowchart of the advertising transmission process of the in-vehicle device in a third erroneous connection detection method.

An advertising transmission process of the in-vehicle device 100 in the third erroneous connection detection method will be described with reference to FIG. 14. FIG. 14 is a flowchart of the advertising transmission process of the in-vehicle device 100 in the third erroneous connection detection method. Regarding processes in FIG. 14, the same processes as those in FIG. 4 are denoted by the same reference numerals, and descriptions thereof will be omitted.

Before the process of S40, the control circuit 201 exchanges characteristics defined by the application of the in-vehicle device 100 among a plurality of other applications of the in-vehicle device 100 (SC01). The subsequent processes are the same as those in FIG. 4.

Figure 15:
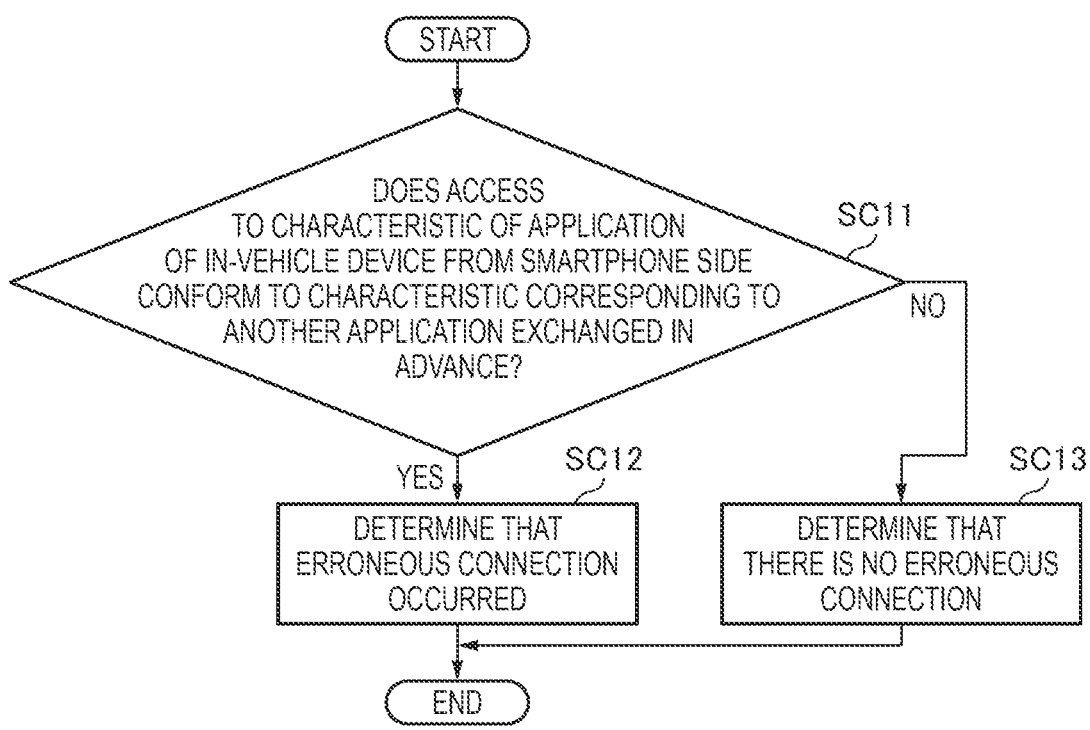
FIG. 15 is a flowchart of processes relating to the third erroneous connection detection method of the in-vehicle device.

Processes relating to the third erroneous connection detection method of the in-vehicle device will be described with reference to FIG. 15. FIG. 15 is a flowchart of the processes relating to the third erroneous connection detection method of the in-vehicle device. Each process of the flowchart according to FIG. 15 is executed by the control circuit 201.

The control circuit 201 determines whether the access to the characteristic of the application of the in-vehicle device 100 from the smartphone side conforms to the characteristic corresponding to another application exchanged in advance (SC11).

When it is determined that the access to the characteristic of the application of the in-vehicle device 100 from the smartphone side conforms to the characteristic corresponding to the another application exchanged in advance in the process of SC11 (YES in SC11), the control circuit 201 determines that an erroneous connection has occurred (SC12).

When it is determined that the access to the characteristic of the application of the in-vehicle device 100 from the smartphone side does not match the characteristic corresponding to another application exchanged in advance in the process of SC11 (NO in SC11), the control circuit 201 determines that there is no erroneous connection (SC13).

Figure 16:
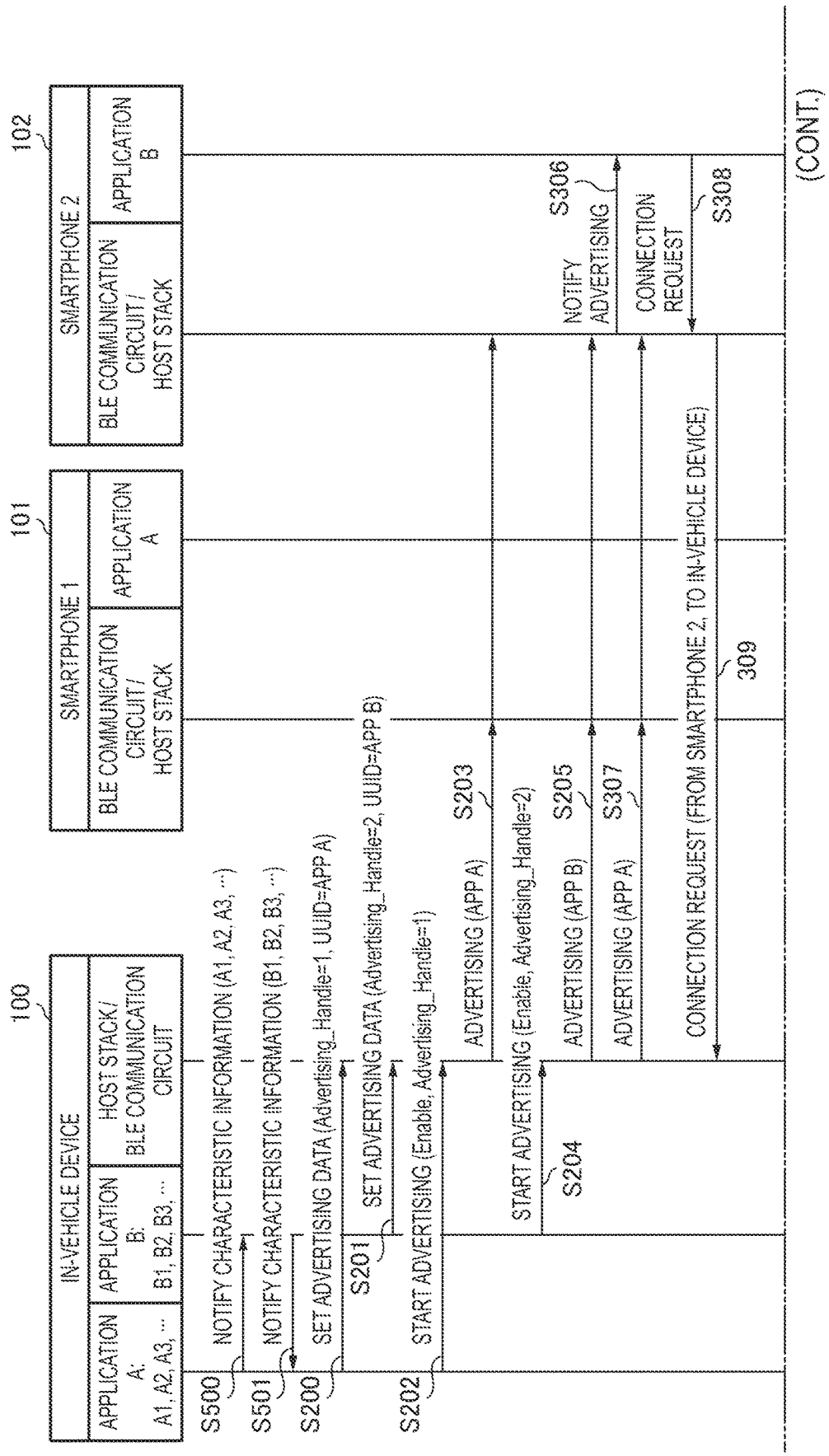
FIG. 16 is a sequence diagram in the case where the erroneous connection occurs when the BLE connection is established between the in-vehicle device and the smartphone.

Next, processes in a case where an erroneous connection occurs when a BLE connection is established between the in-vehicle device and the smartphone will be described with reference to FIG. 16. FIG. 16 is a sequence diagram in the case where the erroneous connection occurs when the BLE connection is established between the in-vehicle device and the smartphone. Regarding the processes in FIG. 16, the same processes as those in FIG. 11 are denoted by the same reference numerals, and descriptions thereof will be omitted. In some parts of FIG. 16, the application A is referred to as App A, and the application B is referred to as App B.

The application A of the in-vehicle device 100 transmits the characteristics A1, A2, A3, . . . to the application B (S500).

The application B of the in-vehicle device 100 transmits the characteristics B1, B2, B3, . . . to the application A (S501).

When the BLE connection is established between the in-vehicle device 100 and the smartphone 102 in the process of S312, the application B of the smartphone 102 transmits an instruction of transmitting a Write request with respect to the in-vehicle device 100 to the BLE communication circuit of the smartphone 102 (S515).

The BLE communication circuit of the smartphone 102 transmits a Write request for the characteristic B1 to the application A of the in-vehicle device 100 (S516).

The application A of the in-vehicle device 100 detects an erroneous connection based on that an access is made from the smartphone 102 to the characteristic B1, which has been exchanged in advance and is a characteristic whose advertising is not terminated (S517).

The application A of the in-vehicle device 100 transmits a request to disconnect the BLE connection to the BLE communication circuit 202 (S518).

The BLE communication circuit 202 transmits the request to disconnect the BLE connection to the smartphone 102 (S519).

The BLE connection between the in-vehicle device 100 and the smartphone 102 is disconnected (S520).

The application A of the in-vehicle device 100 instructs the BLE communication circuit 202 to start transmission of the terminated advertising packet (S521).

The BLE communication circuit 202 transmits the advertising packet including the UUID of the application A by wireless communication (S522).

As a result, in the third erroneous connection detection method, characteristics are exchanged in advance between a plurality of applications of the in-vehicle device 100, and an erroneous connection is detected depending on whether a request for a characteristic of an application whose advertising is not terminated is received from the smartphone side.

<Fourth Erroneous Connection Detection Method>

In the fourth erroneous connection detection method, the control circuit 201 sets a different UUID for each application in the BLE communication circuit 202. The BLE communication circuit 202 repeatedly transmits an advertising packet including a UUID. When the UUID included in the advertising packet whose transmission is terminated does not match the UUID received from the smartphone, the control circuit 201 determines that the smartphone is not the connection destination expected by a first advertising identifier.

In a specific example, a characteristic having a common attribute among respective applications is provided on the GATT server by each application. Here, the characteristic having a common attribute among the respective applications is referred to as a "first order (FO)", for example. After the BLE connection is established between the in-vehicle device 100 and the smartphone, the smartphone side first performs writing, that is, Write of a value of a UUID associated with its own application with which communication is to be performed, in the "first order (FO)". The application of the in-vehicle device 100 that has received the notification of the BLE connection refers to the UUID written in the "first order (FO)" and compares the UUID associated with the application with the UUID written from the smartphone side. When the UUIDs do not match each other, the in-vehicle device 100 determines that the device is not a device intended to be connected, that is, an erroneous connection has occurred.

Figure 17:
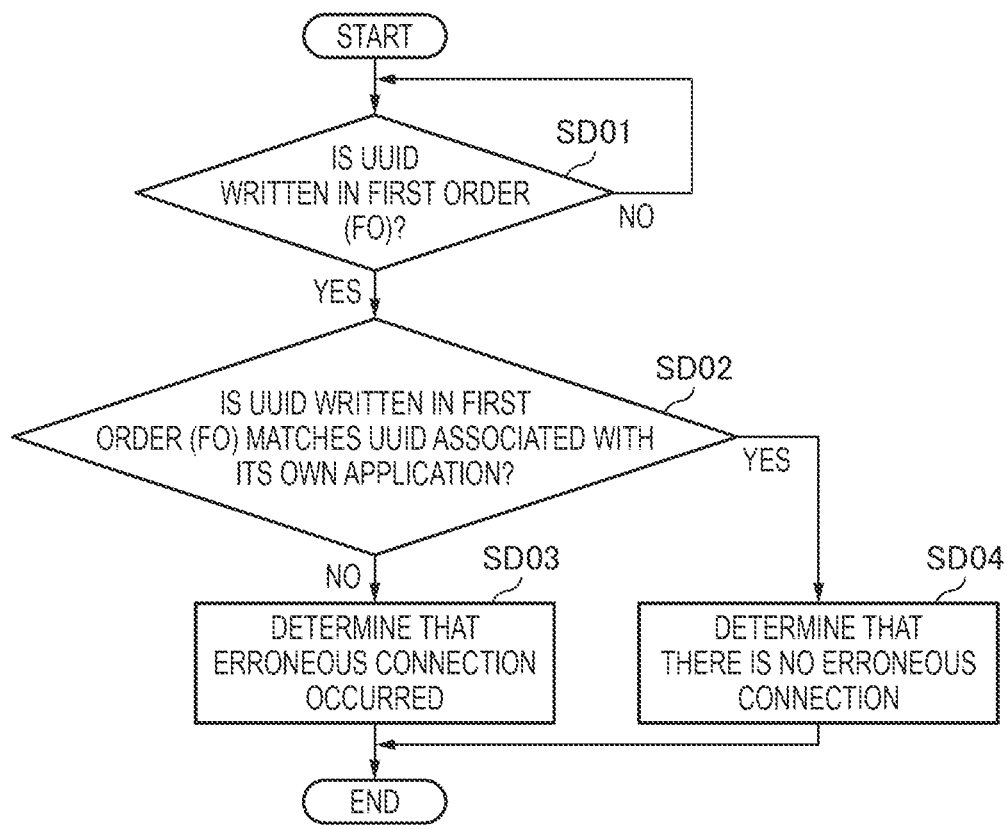
FIG. 17 is a flowchart of processes relating to a fourth erroneous connection detection method of the in-vehicle device.

Processes relating to the fourth erroneous connection detection method of the in-vehicle device will be described with reference to FIG. 17. FIG. 17 is a flowchart of the processes relating to the fourth erroneous connection detection method of the in-vehicle device.

The control circuit 201 determines whether a UUID is written in the first order (FO) (SD01). When the control circuit 201 determines that no UUID is written in the first order (FO) (NO in SD01) in the process of SD01, the process returns to SD01.

When it is determined that the UUID is written in the first order (FO) (YES in SD01), the control circuit 201 determines whether the UUID written in the first order (FO) matches the UUID associated with its own application (SD02).

When it is determined that the UUID written in the first order (FO) does not match the UUID associated with its own application in the process of SD02 (NO in SD02), the control circuit 201 determines that an erroneous connection has occurred (SD03).

When it is determined that the UUID written in the first order (FO) matches the UUID associated with its own application in the process of SD02 (YES in SD02), the control circuit 201 determines that there is no erroneous connection (SD04).

Figure 18:
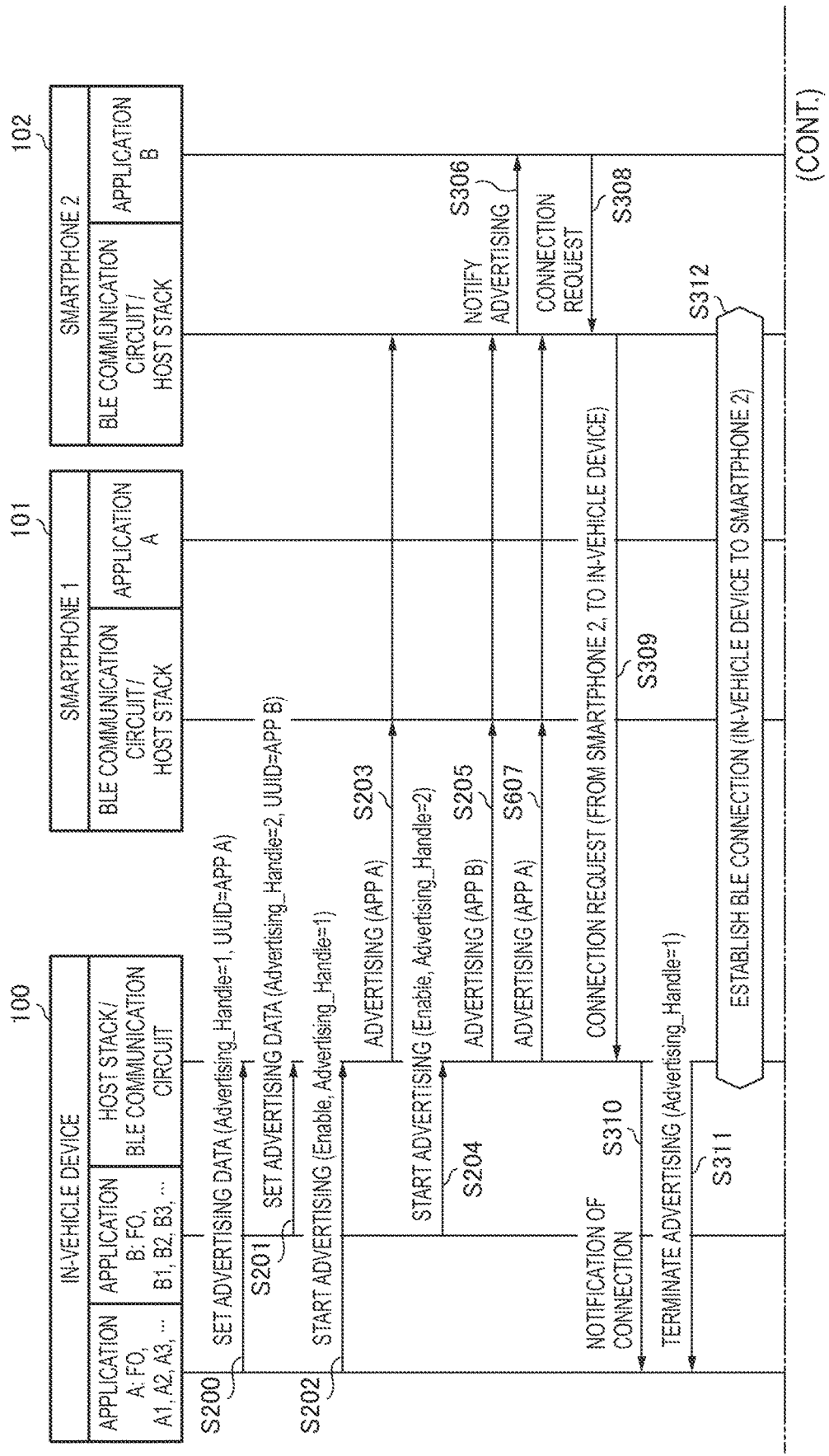
FIG. 18 is a sequence diagram in the case where the erroneous connection occurs when the BLE connection is established between the in-vehicle device and the smartphone.

Next, processes in a case where an erroneous connection occurs when a BLE connection is established between the in-vehicle device and the smartphone will be described with reference to FIG. 18. FIG. 18 is a sequence diagram in the case where the erroneous connection occurs when the BLE connection is established between the in-vehicle device and the smartphone. Regarding the processes in FIG. 18, the same processes as those in FIG. 11 are denoted by the same reference numerals, and descriptions thereof will be omitted.

When the BLE connection is established between the in-vehicle device 100 and the smartphone 102 in the process of S312, the application B of the smartphone 102 transmits a signal of transmitting a Write request with respect to the in-vehicle device 100 to the BLE communication circuit of the smartphone 102 (S613). The Write request is a request to write the UUID of the application B in the characteristic FO of the application A of the in-vehicle device 100.

The BLE communication circuit of the smartphone 102 transmits the Write request of the UUID of the application B to the characteristic FO of the application A of the in-vehicle device 100 (S614).

The application A of the in-vehicle device 100 makes a Write response to the BLE communication circuit of the smartphone 102 (S615).

The application A of the in-vehicle device 100 detects an erroneous connection based on that writing is performed in which the UUID does not match the UUID of its own application with respect to its own characteristic FO (S616).

The application A of the in-vehicle device 100 requests the BLE communication circuit 202 to disconnect the BLE connection (S617).

The BLE communication circuit 202 transmits the request to disconnect the BLE connection to the smartphone 102 (S618).

The BLE connection between the in-vehicle device 100 and the smartphone 102 is disconnected (S619).

The application A of the in-vehicle device 100 instructs the BLE communication circuit 202 to start transmission of the terminated advertising packet (S620).

The BLE communication circuit 202 transmits the advertising packet including the UUID of the application A as a wireless signal (S621).

As a result, in the fourth erroneous connection detection method, a characteristic having a common attribute among the applications is provided, and the application detects an erroneous connection depending on whether writing with respect to the characteristic having the common attribute matches the characteristic of the application.

<Fifth Erroneous Connection Detection Method>

In the fifth erroneous connection detection method, when it is determined that the smartphone with which the BLE connection is established is not the expected connection destination, the control circuit 201 stores the address of the smartphone as a first address. The control circuit 201 causes the BLE communication circuit 202 to restart the repeated transmission of the advertising packet corresponding to the advertising identifier whose transmission has been terminated. When the BLE communication circuit 202 receives a request for a BLE connection, the control circuit 201 determines whether the address of the smartphone as a second address that is the transmission source of the received connection request matches the stored address. When it is determined that the address of the smartphone matches the stored address, the control circuit 201 determines that the smartphone that is the transmission source of the received connection request is not the connection destination expected by the advertising identifier.

More specifically, the fifth erroneous connection detection method is as follows. A first erroneous connection is detected using any one of the first erroneous connection detection method, the second erroneous connection detection method, the third erroneous connection detection method, and the fourth erroneous connection detection method, and a device address of a device in which the erroneous connection has occurred is cached. In second and subsequent erroneous connections, an application of the in-vehicle device 100 that has received a notification of BLE connection compares the cached device address with a device address of the smartphone that has received the notification of BLE connection, and determines that the device is not the device intended to be connected when the device addresses match. As a result, in the fifth erroneous connection detection method, a detection time of the second and subsequent erroneous connections can be shortened. The cached device address is cleared to 0 at an activation timing of the in-vehicle device. That is, the cached device address is cleared at the activation timing of the in-vehicle device.

Among the erroneous connection detection methods, the first erroneous connection detection method, the second erroneous connection detection method, and the fourth erroneous connection detection method are useful in that information exchange between the applications described in the third erroneous connection detection method is not required.

Among the erroneous connection detection methods, the first erroneous connection detection method and the second erroneous connection detection method are useful in that the characteristic having a common attribute among the respective applications described in the fourth erroneous connection detection method is not required.

The above are exemplary embodiments of the present invention, but the present invention is not limited to the scope of the embodiments illustrated in the description and the drawings, and can be carried out with modifications without departing from the gist thereof.

First Modification

Hereinafter, a modification of the in-vehicle device according to the first embodiment of the present invention will be described with reference to the drawings.

A configuration example of a wireless communication system in the first modification is the same as that in FIG. 1, and a hardware configuration of an in-vehicle device is also the same as that in FIG. 2. On the other hand, a software configuration of the in-vehicle device according to the first modification is partially different from that in FIG. 3, and thus will be described with reference to FIG. 19.

Figure 19:
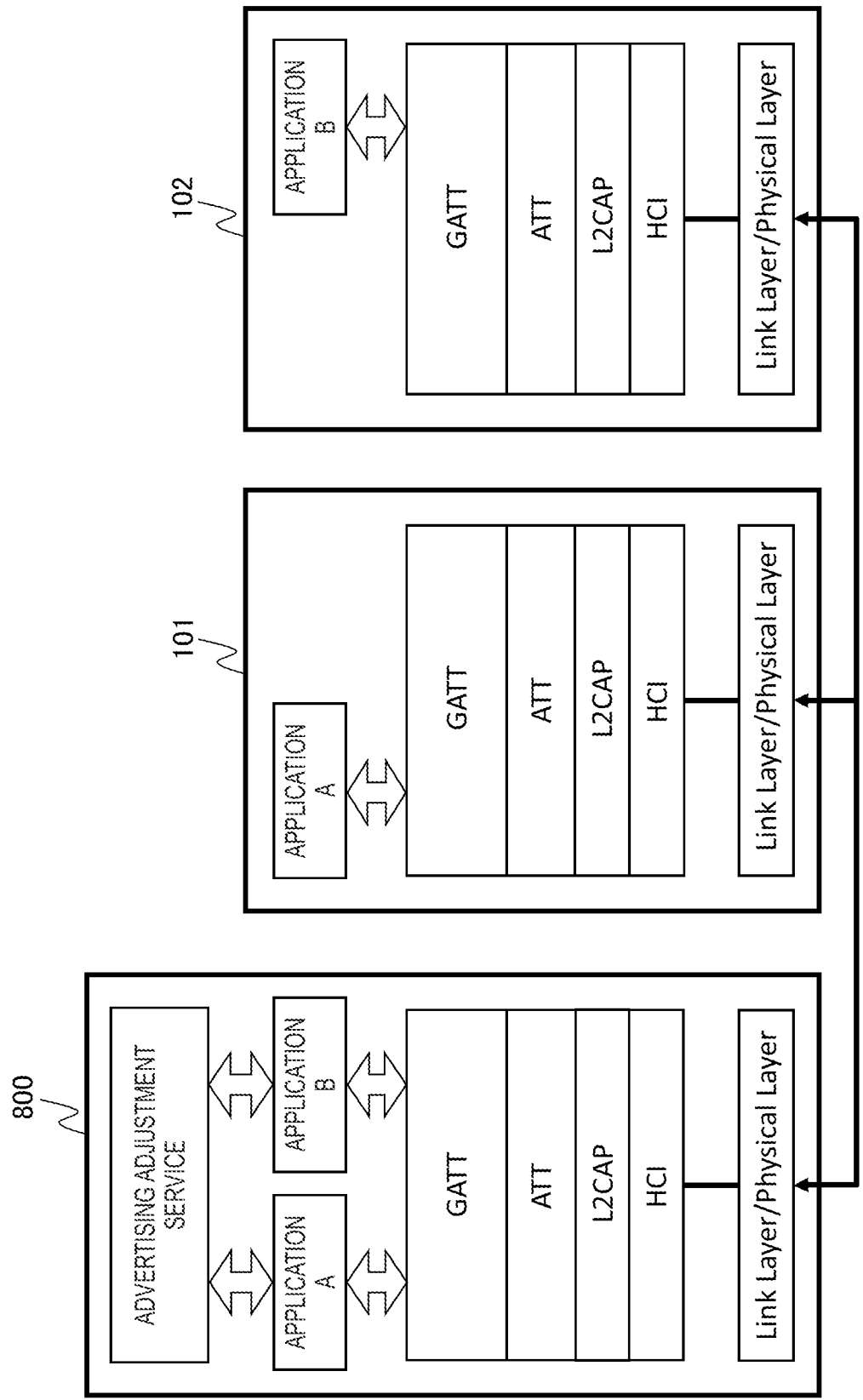
FIG. 19 is a diagram illustrating a hierarchical structure of a software program of an in-vehicle device according to a first modification.

FIG. 19 is a diagram illustrating a hierarchical structure of a software program of the in-vehicle device according to the first modification. In FIG. 19, an in-vehicle device 800 is implemented by software including an advertising adjustment service, an application A, an application B, a GATT, an ATT, an L2CAP, and an HCI. The GATT, the ATT, and the L2CAP are collectively referred to as a host stack.

A Link Layer and a Physical Layer are hardware and are BT controllers corresponding to the BLE communication circuit 202.

The advertising adjustment service is software capable of communicating with the application A and the application B, and performs control for preventing restart of advertising for each application by performing processes to be described later. The GATT, the ATT, the L2CAP, the HCI, the Link Layer, and the Physical Layer configured under the application A and the application B have the same configurations as those in FIG. 3, and descriptions thereof will be omitted.

A process operation of the in-vehicle device implemented as described above will be described below.

Figure 20:
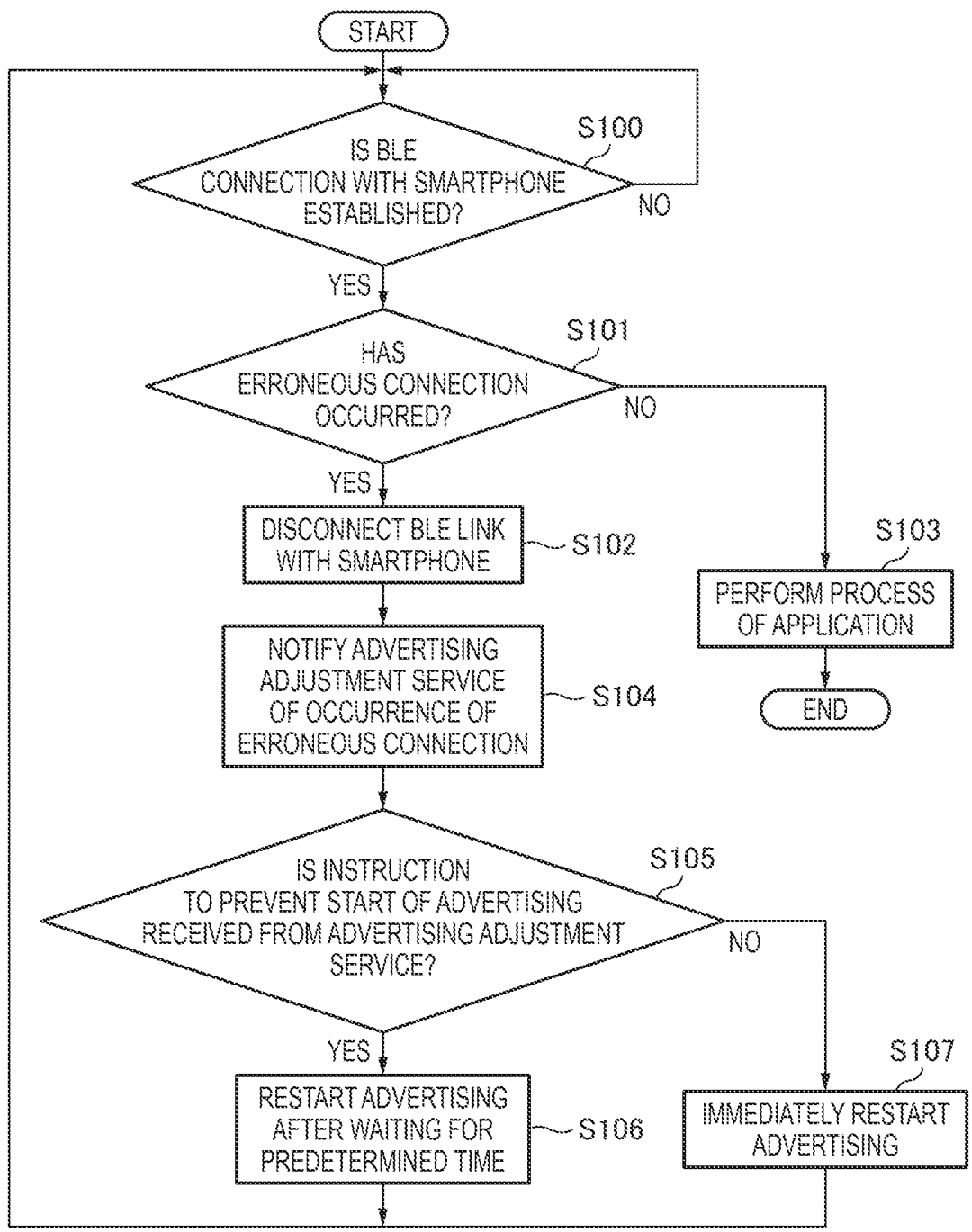
FIG. 20 is a flowchart in which an application program of the in-vehicle device according to the first modification performs an advertising restart process control when an erroneous connection occurs.

FIG. 20 is a flowchart in which an application program of the in-vehicle device according to the first modification performs an advertising restart process control when an erroneous connection occurs. The application is executed by a control circuit (not illustrated) of the in-vehicle device 800. Therefore, the application may be read as a control circuit (not illustrated) of the in-vehicle device 800.

First, the application determines whether a BLE connection with the smartphone is established (S100). When the application determines that the BLE connection with the smartphone is not established (NO in S100), the process returns prior to the process of S100 because the advertising is continued. When the application determines that the BLE connection with the smartphone is established (YES in S100), the process proceeds to S101. In the process of S101, the application determines whether an erroneous connection has occurred.

When it is determined that no erroneous connection has occurred (NO in S101), a connection to a partner intended to be connected is made, and thus the application performs a process relating to the application (S103). On the other hand, when it is determined that an erroneous connection has occurred (YES in S101), the application disconnects the BLE connection with the smartphone (S102). Next, in the process of S104, the application notifies the advertising adjustment service of the occurrence of the erroneous connection. When the occurrence of the erroneous connection is notified, at least one of the UUID of its own application and the advertising identifier is also notified.

The application determines whether an instruction to prevent a start of advertising is received from the advertising adjustment service (S105). When it is determined that the instruction to prevent the start of the advertising is not received (NO in S105), the application immediately restarts the advertising (S107). On the other hand, when it is determined that the instruction to prevent the start of the advertising is received (YES in S105), the application restarts the advertising after waiting for a predetermined time (S106).

An erroneous connection detection method in S101 may be the same as that in the first embodiment.

Next, a process operation of an advertising adjustment service program will be described with reference to FIGS. 21 and 22.

Figure 21:
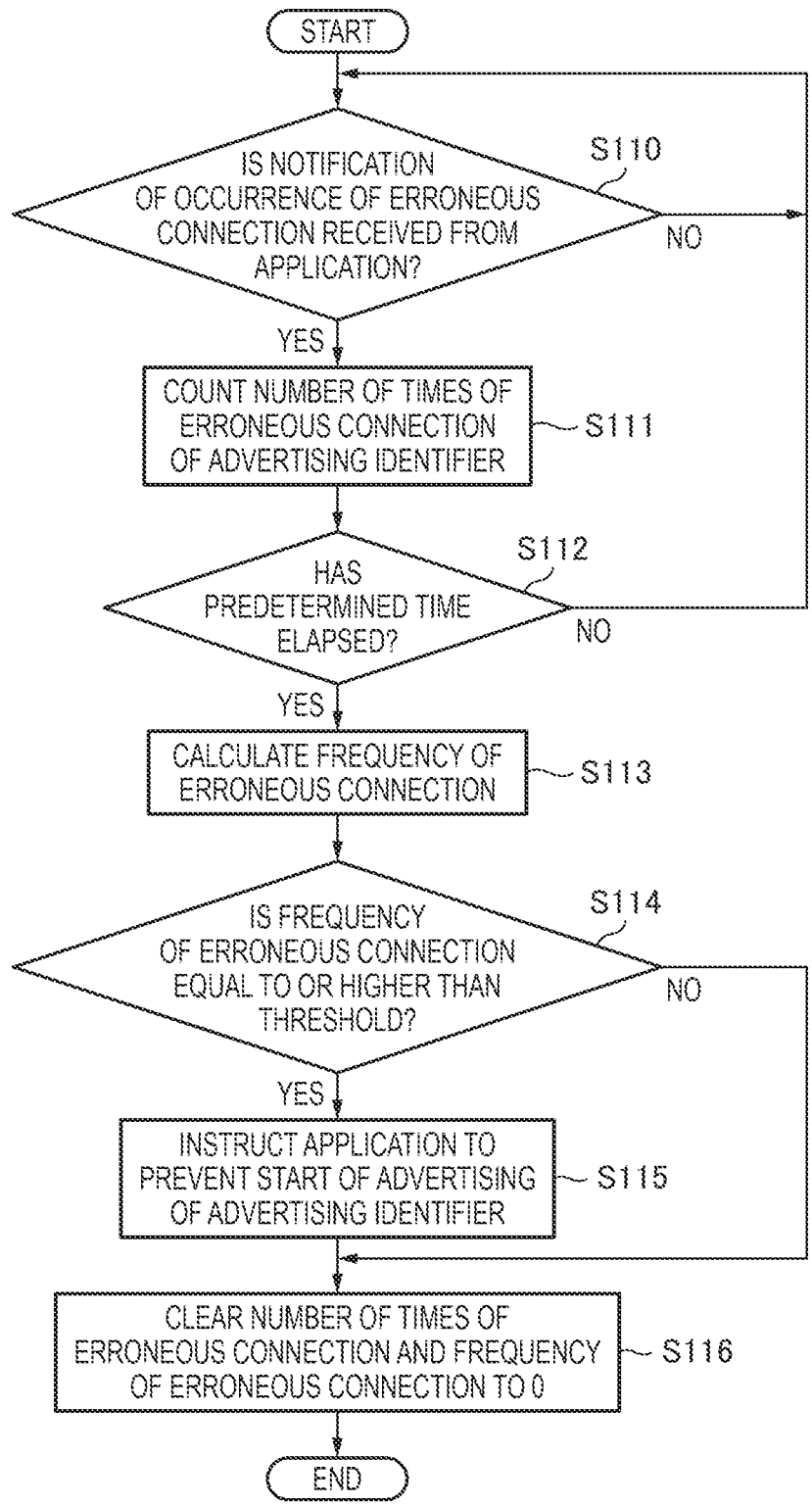
FIG. 21 is a flowchart in which an advertising adjustment service program of the in-vehicle device according to the first modification performs adjustment control with respect to the application program.

FIG. 21 is a flowchart in which the advertising adjustment service program of the in-vehicle device according to the first modification performs adjustment control with respect to the application program. FIG. 22 is a diagram illustrating a management table for the advertising adjustment service program to manage the number of times of erroneous connection and a frequency of erroneous connection for each application. In the drawing, a UUID 1 (application A) represents a UUID for identifying the application A, and a UUID 2 (application B) represents a UUID for identifying the application B. Here, the management table is stored in, for example, the memory of the storage device 205.

First, the advertising adjustment service determines whether a notification of occurrence of an erroneous connection is received from an application (S110). When it is determined that the notification of occurrence of an erroneous connection is not received (NO in S110), the process returns prior to the process of S110 and the advertising adjustment service waits for the notification from the application.

On the other hand, when it is determined that the notification of occurrence of an erroneous connection is received from the application (YES in S110), the advertising adjustment service counts the number of times of erroneous connection of the advertising identifier (S111). The counted number of times of erroneous connection is used to update the number of times of erroneous connection in the management table illustrated in FIG. 22. Specifically, in the case of the application A, the number of times of erroneous connection corresponding to an advertising identifier 1 is updated to the value of the counted number of times of erroneous connection, and in the case of the application B, the number of times of erroneous connection corresponding to an advertising identifier 2 is updated to the value of the counted number of times of erroneous connection.

Next, the advertising adjustment service determines whether a predetermined time has elapsed from the start of the process (S112). When the advertising adjustment service determines that the predetermined time has not elapsed (NO in S112), the process returns prior to the process of S110. When it is determined that the predetermined time has elapsed (YES in S112), the advertising adjustment service calculates a value obtained by dividing the frequency of erroneous connection, that is, the number of times of erroneous connection by the predetermined time (S113). The calculated frequency of erroneous connection is used to update the frequency of erroneous connection in the management table illustrated in FIG. 22. Specifically, in the case of application A, the frequency of erroneous connection corresponding to the advertising identifier "1" is updated to the value of the calculated frequency of erroneous connection, and in the case of application B, the frequency of erroneous connection corresponding to the advertising identifier "2" is updated to the value of the calculated frequency of erroneous connection.

The advertising adjustment service determines whether the frequency of erroneous connection is equal to or higher than a predetermined threshold (S114). When the advertising adjustment service determines that the frequency of erroneous connection is not equal to or higher than the predetermined threshold (NO in S114), the process proceeds to S116. When it is determined that the frequency of erroneous connection is equal to or higher than the predetermined threshold (YES in S114), the advertising adjustment service instructs the application to prevent the start of the advertising of the advertising identifier (S115). The threshold may be variable depending on the number of applications set up in the in-vehicle device.

The advertising adjustment service clears the number of times of erroneous connection and the frequency of erroneous connection to 0 (S116). FIG. 22 illustrates a state of the management table when the number of times of erroneous connection and the frequency of erroneous connection are cleared to 0.

As described above, according to the in-vehicle device 800 of the first modification, it is possible to monitor the frequency of erroneous connection and to prevent the restart of the advertising having a high frequency of erroneous connection for a certain period of time by further including the advertising adjustment service program. This can contribute to preventing an erroneous connection and improving connectivity with a partner device that is originally desired to be connected.

In addition, although it has been described that the advertising adjustment service program monitors the frequency of erroneous connection and prevents the restart of the advertising having a high frequency of erroneous connection for a certain period of time, the present invention is not limited thereto, and a cycle of the advertising having a high frequency of erroneous connection may be controlled to be longer than that before the occurrence of the erroneous connection.

As described above, the wireless communication device (for example, in-vehicle device 100) according to the present embodiment includes a communication unit (for example, BLE communication circuit 202) that performs wireless communication with other wireless communication devices, and a control circuit (for example, control circuit 201) that controls the communication unit. The control circuit sets a different advertising identifier for each application in the communication unit. The communication unit repeatedly transmits an advertising packet that corresponds to the set advertising identifier and does not include the advertising identifier. The communication unit receives a connection request for wireless communication transmitted from a first wireless communication device that is one of the other wireless communication devices that have received the advertising packet. The communication unit terminates transmission of the advertising packet transmitted immediately before the connection request is received. The communication unit wirelessly connects to the first wireless communication device that is a transmission source of the connection request. The control circuit determines whether the wirelessly connected first wireless communication device (for example, smartphone 101 or smartphone 102) is the connection destination expected by the first advertising identifier which is the advertising identifier that corresponds to the advertising packet whose transmission is terminated.

As a result, the wireless communication device can avoid loss of a connection opportunity with a connection partner originally expected to be connected by detecting a wireless communication connection with another wireless communication device that is not originally intended to be connected.

In addition, the control circuit according to the present embodiment disconnects the wireless connection with the first wireless communication device when it is determined that the wirelessly connected first wireless communication device is not the connection destination expected by the first advertising identifier. The control circuit causes the communication unit to restart repeated transmission of the advertising packet that corresponds to the first advertising identifier and whose transmission has been terminated. As a result, the wireless communication device restarts the transmission of the advertising packet that has been terminated due to the wireless communication connection with the another wireless communication device that is not originally intended to be connected, and thus can establish connection with the connection partner originally expected to be connected.

In addition, the control circuit according to the present embodiment determines that the first wireless communication device is not the connection destination expected by the first advertising identifier, when an access from the first wireless communication device to a characteristic does not conform to a first characteristic related to the first advertising identifier, or when there is no access from the first wireless communication device to the first characteristic. As a result, the wireless communication device can detect that the device is the device that is not originally intended to be connected by determining whether there is an expected access to the characteristic of the wireless communication device, and can avoid loss of a connection opportunity with a connection partner originally expected to be connected.

In addition, the control circuit according to the present embodiment determines that the first wireless communication device is not the connection destination expected by the first advertising identifier, when the wireless connection is disconnected from the first wireless communication device. As a result, the wireless communication device can detect that the device is the device that is not originally intended to be connected by disconnecting the wireless communication connection from an another wireless communication device side, and can avoid loss of a connection opportunity with a connection partner originally expected to be connected.

In addition, the control circuit according to the present embodiment determines that the first wireless communication device is not the connection destination expected by the first advertising identifier, when an access from the first wireless communication device to a characteristic conforms to a second characteristic related to a second advertising identifier different from the first advertising identifier. As a result, the wireless communication device can detect that the wireless communication device is connected to the device that is not originally intended to be connected by an access to a characteristic different from the characteristic of the wireless communication device. Accordingly, the wireless communication device can avoid loss of a connection opportunity with a connection partner originally expected to be connected.

In addition, the control circuit according to the present embodiment sets, in the communication unit, a different universally unique identifier (UUID) for each application. The communication unit repeatedly transmits the advertising packet including the UUID. The control circuit determines that the first wireless communication device is not the connection destination expected by the first advertising identifier, when the UUID included in the advertising packet whose transmission is terminated does not match the UUID received from the first wireless communication device. As a result, the wireless communication device can detect that the device is the device that is not originally intended to be connected by determining whether the UUID included in the advertising packet matches the UUID of the wireless communication device. Accordingly, the wireless communication device can avoid loss of a connection opportunity with a connection partner originally expected to be connected.

In addition, the control circuit according to the present embodiment stores a first address that is an address of the first wireless communication device when it is determined that the first wireless communication device is not the connection destination expected by the first advertising identifier. The control circuit causes the communication unit to restart repeated transmission of the advertising packet that corresponds to the first advertising identifier and whose transmission is terminated. When the connection request is received by the communication unit, the control circuit determines whether a second address that is an address of the other wireless communication device that is the transmission source of the received connection request matches the stored first address of the first wireless communication device. When it is determined that the first address and the second address match, the control circuit determines that the other wireless communication device that is the transmission source of the received connection request is not the connection destination expected by the first advertising identifier. As a result, when a connection with an unintended device is detected once, the wireless communication device can detect a connection with the unintended device by comparing the device addresses in the second and subsequent connections. Accordingly, the wireless communication device can avoid loss of a connection opportunity with a connection partner originally expected to be connected.

In addition, the control circuit according to the present embodiment measures, for each advertising identifier, the frequency of wireless connection with another wireless communication device that is a connection destination not expected by the advertising identifier. When the communication unit is caused to restart repeated transmission of the advertising packet that corresponds to an advertising identifier whose frequency is equal to or higher than a predetermined threshold, the control circuit waits for a predetermined period and then restarts the repeated transmission. As a result, the wireless communication device can be prevented from being connected to an unintended device many times.

In addition, the communication unit according to the present embodiment controls the wireless communication based on a Bluetooth (registered trademark) standard. As a result, the wireless communication device can execute transmission of a plurality of advertising packets defined in the Bluetooth standard.

In the above-described embodiment and the modification, a case where two smartphones are connected to the in-vehicle device is exemplified, but the present invention can also be applied to a case where a plurality of remote devices are further connected. The remote device is not limited to the smartphone, and connection can also be made with a tablet terminal, a mobile phone in the related art, an audio player, a smart watch, a remote controller, or the like. In particular, in the in-vehicle device illustrated in the modification, it is possible to exhibit an effect in a situation where a plurality of remote devices are present and erroneous connections occur frequently, and it is possible to shorten the entire connection time until all the remote devices are BLE connected, that is, it is possible to improve wireless band utilization efficiency.

Although the host stack including the GATT, the ATT, and the L2CAP is described as software, the host stack may be installed in the hardware of the BT controller to move an interface between the software and the hardware.

In addition, in the above-described embodiment and modification, the in-vehicle device has been described as an example of the wireless communication device that executes the processes illustrated in FIGS. 8, 20, and 21, but the present invention is not limited thereto and can be applied to various devices such as a television set, a Blu-ray/DVD recorder, a refrigerator, a washing machine, a vacuum cleaner, a microwave oven, a lighting device, an air conditioner, an air cleaner, a camera, a printer, a projector, a scanner, a fitness device, a vending machine, a game machine, and a beacon device installed in a store and associated with connection.

The present invention has been described assuming that the program for realizing one or more functions of the above-described embodiment is provided in the in-vehicle device, but the present invention is not limited thereto, and can also be realized by a process in which the program is supplied to a device via an external network, an over the air (OTA), or a storage medium, and a processor in a computer of the device reads and executes the program.

Some or all of the exemplary embodiments described above may be described as in the following supplementary notes, but are not limited to the following description.

Appendix (Item 1)

A wireless communication device including
a communication unit that performs wireless communication with other wireless communication devices; and
a control circuit that controls the communication unit, in the wireless communication device,
the control circuit
sets, in the communication unit, a different advertising identifier for each application,
the communication unit
repeatedly transmits an advertising packet that corresponds to the set advertising identifier and does not include the advertising identifier,
receives a connection request transmitted from a first wireless communication device that is one of the other wireless communication devices that have received the advertising packet,
terminates transmission of the advertising packet transmitted immediately before the connection request is received, and
wirelessly connects to the first wireless communication device, and
the control circuit
further determines whether the first wireless communication device is a connection destination expected by a first advertising identifier which is the advertising identifier that corresponds to the advertising packet whose transmission is terminated.

(Item 2)

The wireless communication device according to item 1, in which
the control circuit
disconnects the wireless connection with the first wireless communication device when it is determined that the first wireless communication device is not the connection destination expected by the first advertising identifier, and
causes the communication unit to restart repeated transmission of the advertising packet that corresponds to the first advertising identifier and whose transmission is terminated.

(Item 3)

The wireless communication device according to item 1 or 2, in which
the control circuit
determines that the first wireless communication device is not the connection destination expected by the first advertising identifier, when an access from the first wireless communication device to a characteristic does not conform to a first characteristic related to the first advertising identifier, or when there is no access from the first wireless communication device to the first characteristic.

(Item 4)

The wireless communication device according to item 1 or 2, in which
the control circuit
determines that the first wireless communication device is not the connection destination expected by the first advertising identifier, when the wireless connection is disconnected from the first wireless communication device.

(Item 5)

The wireless communication device according to item 1 or 2, in which
the control circuit
determines that the first wireless communication device is not the connection destination expected by the first advertising identifier, when an access from the first wireless communication device to a characteristic conforms to a second characteristic related to a second advertising identifier different from the first advertising identifier.

(Item 6)

The wireless communication device according to item 1 or 2, in which
the control circuit
sets, in the communication unit, a different universally unique identifier (UUID) for each application,
the communication unit
repeatedly transmits the advertising packet including the UUID, and
the control circuit
further determines that the first wireless communication device is not the connection destination expected by the first advertising identifier, when the UUID included in the advertising packet whose transmission is terminated does not match the UUID received from the first wireless communication device.

(Item 7)

The wireless communication device according to any one of items 2 to 6, in which
the control circuit
stores a first address that is an address of the first wireless communication device when it is determined that the first wireless communication device is not the connection destination expected by the first advertising identifier,
causes the communication unit to restart repeated transmission of the advertising packet that corresponds to the first advertising identifier and whose transmission is terminated,
when the connection request is received by the communication unit, determines whether a second address that is an address of the other wireless communication device that is the transmission source of the received connection request matches the stored first address of the first wireless communication device, and
when it is determined that the first and second addresses match, determines that the other wireless communication device is not the connection destination expected by the first advertising identifier.

(Item 8)

The wireless communication device according to any one of items 1 to 7, in which
the control circuit
measures, for each advertising identifier, a frequency of connection with another wireless communication device that is a connection destination not expected by the advertising identifier, and when the communication unit is caused to restart repeated transmission of the advertising packet that corresponds to an advertising identifier whose frequency is equal to or higher than a predetermined threshold, restarts the repeated transmission after waiting for a predetermined period.

(Item 9)

The wireless communication device according to any one of items 1 to 8, in which
the communication unit controls wireless communication based on a Bluetooth (registered trademark) standard.

(Item 10)

A wireless communication method based on a wireless communication device, the wireless communication method includes:
setting a different advertising identifier for each application;
repeatedly transmitting an advertising packet that corresponds to the set advertising identifier and does not include the advertising identifier;
receiving a connection request for wireless communication transmitted from a first wireless communication device that is one of other wireless communication devices that have received the advertising packet;
terminating transmission of the advertising packet transmitted immediately before the connection request is received;
wirelessly connecting to the first wireless communication device; and
determining whether the first wireless communication device is a connection destination expected by a first advertising identifier which is the advertising identifier that corresponds to the advertising packet whose transmission is terminated.

(Item 11)

A computer program for causing a computer to execute the wireless communication method according to item 10.

Although the embodiment has been described above with reference to the accompanying drawings, the present disclosure is not limited to such an example. It is apparent to those skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. The components in the embodiment described above may be freely combined without departing from the gist of the invention.

INDUSTRIAL APPLICABILITY

The wireless communication device of the present invention is useful as an in-vehicle device, a television set, a Blu-ray/DVD recorder, a refrigerator, a washing machine, a vacuum cleaner, a microwave oven, a lighting device, an air conditioner, an air cleaner, a camera, a printer, a projector, a scanner, a fitness device, a vending machine, a game machine, and a beacon device installed in a store and associated with connection.

What is claimed is:

1. A wireless communication device comprising:
a communication unit configured to perform wireless communication with other wireless communication devices; and
a control circuit configured to control the communication unit, wherein
the control circuit is configured to
set, in the communication unit, an advertising identifier, a different advertising identifier being set for each application,
the communication unit is configured to
repeatedly transmit an advertising packet that corresponds to the advertising identifier thus set and does not include the advertising identifier,
receive a connection request transmitted from a first wireless communication device that is one of the other wireless communication devices that have received the advertising packet,
terminate transmission of the advertising packet transmitted immediately before the connection request is received, and
wirelessly connect to the first wireless communication device, and
the control circuit is further configured to
determine whether the first wireless communication device is a connection destination expected by a first advertising identifier which is the advertising identifier that corresponds to the advertising packet whose transmission is terminated,
disconnect the wireless connection with the first wireless communication device in case the control circuit determines that the first wireless communication device is not the connection destination expected by the first advertising identifier, and
cause the communication unit to restart repeated transmission of the advertising packet that corresponds to the first advertising identifier and whose transmission is terminated.

2. The wireless communication device according to claim 1, wherein
the control circuit is configured to
determine that the first wireless communication device is not the connection destination expected by the first advertising identifier, when an access from the first wireless communication device to a characteristic does not conform to a first characteristic related to the first advertising identifier, or when there is no access from the first wireless communication device to the first characteristic.

3. The wireless communication device according to claim 1, wherein
the control circuit is configured to
determine that the first wireless communication device is not the connection destination expected by the first advertising identifier, when the wireless connection is disconnected from the first wireless communication device.

4. The wireless communication device according to claim 1, wherein
the control circuit is configured to
determine that the first wireless communication device is not the connection destination expected by the first advertising identifier, when an access from the first wireless communication device to a characteristic conforms to a second characteristic related to a second advertising identifier different from the first advertising identifier.

5. The wireless communication device according to claim 1, wherein
the control circuit is configured to
set, in the communication unit, a different universally unique identifier (UUID) for each application, the communication unit is configured to
repeatedly transmit the advertising packet including the UUID, and
the control circuit is further configured to
determine that the first wireless communication device is not the connection destination expected by the first advertising identifier, when the UUID included in the advertising packet whose transmission is terminated does not match the UUID received from the first wireless communication device.

6. The wireless communication device according to claim 1, wherein
the control circuit is configured to
store a first address of the first wireless communication device when it is determined that the first wireless communication device is not the connection destination expected by the first advertising identifier,
cause the communication unit to restart repeated transmission of the advertising packet that corresponds to the first advertising identifier,
when the connection request is received by the communication unit, the control circuit is configured to determine whether a second address of the other wireless communication device that is the transmission source of the connection request thus received matches the first address of the first wireless communication device thus stored, and
when it is determined that the first address and the second address match, the control circuit is configured to determine that the other wireless communication device is not the connection destination expected by the first advertising identifier.

7. The wireless communication device according to claim 1, wherein
the control circuit is configured to measure, for each advertising identifier, a frequency of connection with another wireless communication device that is a connection destination not expected by the advertising identifier, and
when the communication unit is caused to restart repeated transmission of the advertising packet that corresponds to an advertising identifier whose frequency is equal to or higher than a predetermined threshold, the control circuit is configured to restart the repeated transmission after waiting for a predetermined period.

8. The wireless communication device according to claim 1, wherein the communication unit is configured to control the wireless communication based on a Bluetooth (registered trademark) standard.

9. A wireless communication method based on a wireless communication device, the wireless communication method comprising:
setting an advertising identifier, a different advertising identifier being set for each application;
repeatedly transmitting an advertising packet that corresponds to the advertising identifier thus set and does not include the advertising identifier;
receiving a connection request for wireless communication transmitted from a first wireless communication device that is one of other wireless communication devices that have received the advertising packet;
terminating transmission of the advertising packet transmitted immediately before the connection request is received;
wirelessly connecting to the first wireless communication device;
determining whether the first wireless communication device is a connection destination expected by a first advertising identifier which is the advertising identifier that corresponds to the advertising packet whose transmission is terminated;
disconnecting the wireless connection with the first wireless communication device in case it is determined that the first wireless communication device is not the connection destination expected by the first advertising identifier; and
restarting repeated transmission of the advertising packet that corresponds to the first advertising identifier and whose transmission is terminated.

10. A non-transitory computer readable storage medium on which a computer program causing a computer to execute the wireless communication method according to claim 9.

* * * * *